(12) United States Patent
Meike et al.

(10) Patent No.: US 8,736,860 B2
(45) Date of Patent: May 27, 2014

(54) SYSTEM AND METHOD FOR DOCUMENT TRANSMISSION

(75) Inventors: Roger Charles Meike, Redwood City, CA (US); David Paul Yach, Waterloo (CA); Richard John George, Waterloo (CA); Tu Dien Do, Kanata (CA)

(73) Assignee: Blackberry Limited, Waterloo, Ontario (CA)

(*) Notice: Subject to any disclaimer, the term of this patent is extended or adjusted under 35 U.S.C. 154(b) by 0 days.

(21) Appl. No.: 13/570,337

(22) Filed: Aug. 9, 2012

(65) Prior Publication Data

US 2012/0300242 A1    Nov. 29, 2012

Related U.S. Application Data

(63) Continuation of application No. PCT/US2011/056385, filed on Oct. 14, 2011.

(60) Provisional application No. 61/471,594, filed on Apr. 4, 2011, provisional application No. 61/473,488, filed on Apr. 8, 2011.

(51) Int. Cl.
  *G06K 15/02* (2006.01)
(52) U.S. Cl.
  USPC .......................................... 358/1.13; 358/1.15
(58) Field of Classification Search
  USPC ............................................... 358/1.13, 1.15
  See application file for complete search history.

(56) References Cited

U.S. PATENT DOCUMENTS

| | | | |
|---|---|---|---|
| 6,301,609 B1 | 10/2001 | Aravamudan et al. | |
| 6,886,036 B1 | 4/2005 | Santamaki et al. | |
| 6,978,378 B1 | 12/2005 | Koretz | |
| 7,405,844 B2 | 7/2008 | Ferlitsch | |
| 7,522,675 B2 | 4/2009 | Sheynman et al. | |
| 7,889,374 B2 | 2/2011 | Wang et al. | |
| 2003/0220994 A1* | 11/2003 | Zhu | 709/223 |
| 2004/0205453 A1 | 10/2004 | Mortensen | |
| 2006/0033956 A1* | 2/2006 | Takahashi | 358/1.15 |
| 2007/0240042 A1 | 10/2007 | Sato | |
| 2010/0131358 A1* | 5/2010 | Ueshima | 705/14.45 |
| 2010/0275115 A1 | 10/2010 | Oh et al. | |

FOREIGN PATENT DOCUMENTS

EP    1 832 971 A1    9/2007

OTHER PUBLICATIONS

International Search Report issued Jan. 17, 2012, in PCT/US2011/056385 filed Oct. 14, 2011.
International Written Opinion issued Jan. 17, 2012, in PCT/US2011/056385 filed Oct. 14, 2011.

(Continued)

*Primary Examiner* — Qian Yang
(74) *Attorney, Agent, or Firm* — Oblon, Spivak, McClelland, Maier & Neustadt, L.L.P.

(57) ABSTRACT

The present disclosure provides methods and apparatus for managing a document. An example aspect provides a method of requesting a document to be displayed at a portable electronic device, including: installing at a computer a printer driver for displaying documents at the portable electronic device; creating an association of a portable account identifier with a unique identifier of the portable electronic device; using the printer driver and the association, to transmit the document to the portable electronic device over a network; and transmitting from the computer the document.

26 Claims, 15 Drawing Sheets

(56) References Cited

OTHER PUBLICATIONS iPrinter, Apr. 7, 2010.
ACTPrinter, 2005. http://www.houdah.com/ACTPrinter.
Print 2 Phone. 2010. http://alfoldinorbert.hu/print2phone/.
Instapaper. Mar. 22, 2011.
Lardinois, Frederic. "Read It Later: iPhone Bookmarking and Offline Reading on Steroids." Apr. 10, 2009. http://readwrite.com/2009/04/10/read_it_later_iphone_bookmarking_and_offline_reading.
Savov, Vlad. "HTC Flyer Parades Its Many Unique Qualities in Latest Video from the Company". Mar. 31, 2011. http://www.engadget.com/2011/03/31/htc-flyer-parades-its-many-unique-qualities-in-latest-video-from/.
Good.iWare Ltd. "GoodReader for iPad." Mar. 4, 2011.
Internet Printing Protocol. Jan. 22, 2011.
Schroeder, Kurt. IBM Systems Magazine. "Encrypted Printing via Internet Printing Protocol." Jun. 2007.
Ecamm Networks Printer Options. Mar. 3, 2011.

\* cited by examiner

SYSTEM AND METHOD FOR DOCUMENT TRANSMISSION

CROSS-REFERENCE TO RELATED APPLICATIONS

This application is a continuation of International Application No. PCT/US2011/056385, filed Oct. 14, 2011, which claims the benefit of U.S. Provisional Patent Application No. 61/471,594, filed Apr. 4, 2011, and U.S. Provisional Patent Application No. 61/473,488, filed Apr. 8, 2011. The contents of all of these applications are expressly incorporated herein by reference in their entirety.

FIELD

The present disclosure relates generally to computing devices and more specifically relates to a document management system using printer emulation.

BACKGROUND

Portable computing devices are increasingly powerful. Likewise more progress is being made towards paperless environments. Portable computing devices can support the goals of achieving paperless environments.

DETAILED DESCRIPTION OF EXAMPLE EMBODIMENTS

Figure 1:
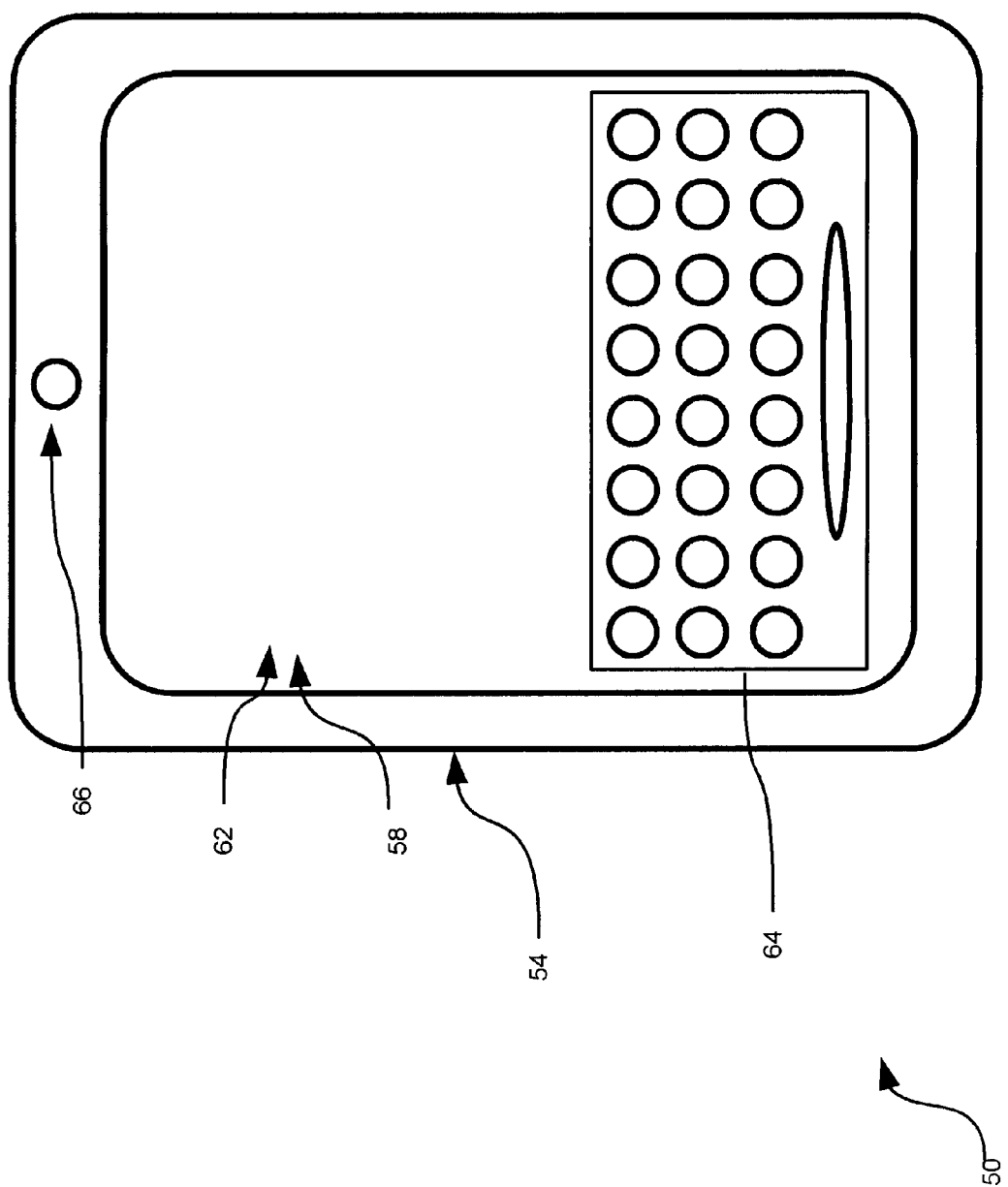
FIG. 1 is a schematic representation of a front view of an example tablet computer.

An example aspect provides a method of requesting a document to be displayed at a portable electronic device, including: installing at a computer a printer driver for displaying documents at the portable electronic device; creating an association of a portable account identifier with a unique identifier of the portable electronic device; using the printer driver and the association, to transmit the document to the portable electronic device over a network; and transmitting from the computer the document.

An example aspect provides a method of displaying a document at a portable electronic device, including: creating an association of a portable account identifier with a unique identifier of the portable electronic device; using the association, to receive at the portable electronic device over a network the document; receiving an input at the portable electronic device to display the document; and displaying the document on a display of the portable electronic device.

An example aspect provides a method of identifying a document to be displayed at a portable electronic device, including: creating an association of a portable account identifier with a unique identifier of the portable electronic device; installing at a computer a printer driver for printing at the portable electronic device, including adding the portable electronic device to a list of printer devices available to the computer; using the association and the printer driver, including selecting the portable electronic device from the list of printer devices, to transmit the document to the portable electronic device over a network; and transmitting from the computer the document.

An example aspect provides a portable electronic device to display a document, including a display. The portable electronic device further includes a processor, controlling the display, and configured to: create an association of a portable account identifier with a unique identifier of the portable electronic device; use the association, to receive at the portable electronic device over a network the document; and receive an input at the portable electronic device to display the document; and display the document on the display.

An example aspect provides a method for document management using printer emulation at a portable electronic device including: establishing a relationship in electronic memory of the portable electronic device between a portable account identifier and a unique identifier of the portable electronic device; receiving a print request at the portable electronic device over a network; the print request originating from a computer and wherein a network printer address for the portable electronic device used to route the print request is managed by a server based on the relationship between the portable account identifier and the unique identifier; the print request including an output file; generating the output file on a display of the portable electronic device. The method can further include removing the relationship such that further print requests are not receivable at the portable electronic device.

Another example aspect provides a method for managing a document using printer emulation, the method including: associating a portable account identifier with a portable electronic device, wherein the portable account identifier is removably associated with the portable electronic device; receiving a request at a server, the request including the portable account identifier of the portable electronic device; and directing an output file to a print service of the portable electronic device using a network connection.

Other example aspects of this method are as follows. The request can be received from a computer. The output file can be sent from a computer to the portable electronic device. The output file can be pulled from a computer to the portable electronic device. The output file can be sent directly from a computer to portable electronic device after getting the unique identifier. The associating can be continuously performed. The file can be held back when the portable electronic device is not ready. Communications between the server and the portable electronic device can occur over protocols associated with a multimedia communications application at the portable electronic device.

A further example aspect provides a method for managing a document using printer emulation, the method including: adding a portable account identifier to a list of printer devices available on a computer, the portable account identifier being removably associated with a portable electronic device; generating an output file from the document; sending a request to transmit an output file, the request sent to a server wherein the request includes the portable account identifier; and transmitting the output file to the portable electronic device associated with the portable account identifier.

Other example aspects of this method are as follows. Receiving of the association can be from the server. Transmitting can be through the server. The transmitting through the server can include the server sending the output file as an email attachment to the portable electronic device. The output file can be transmitted directly to the portable electronic device.

Yet a further example aspect can provides a method for managing a document using printer emulation, the method including: selecting a portable electronic device of a receiver for outputting a document, wherein selecting involves receiving sender-specified input from a print menu at a client device; establishing a network connection between the client device and the portable electronic device, wherein establishing involves removably associating the portable electronic device with the receiver using a server; generating an output file from the document at a client device; transmitting the output file from the client device to the portable electronic device; receiving the output file at the portable electronic device; and displaying the output file on a display screen of the portable electronic device.

Other example aspects of this method are as follows. The generating can include using a printer driver to generate the output file. The portable electronic device can include a tablet computer. The establishing can include determining whether the portable electronic device is available to receive the output file. The transmitting can include, when the portable electronic device is unavailable, delaying transmitting until the portable electronic device becomes available. The transmitting can include transmitting the output file directly to the portable electronic device from the client device. The transmitting can include transmitting the output file to the portable electronic device from the client device through the server. The output file can be transmitted from the server to the portable electronic device via email. The method can further include encrypting the output file. The encrypting can include encrypting the output file at the client device and decrypting the output file at the portable electronic device. The method can further include providing an availability status of the portable electronic device to the client device. The network connection can be a wireless connection. The method can further include putting the output file in a print queue. The method can further include one or more of: receiving a user-inputted command at the output device to sort the output file among other files; highlighting a portion of the output file; forwarding the output file to another device; and bookmarking a portion of the output file. The output file can be a portable document format (PDF) document. The method can be performed using a Samba browser. The method can further include informing the client device of the print service. The informing can be performed using a Bonjour browser. The method can further include providing a prompt at portable electronic device when establishing the network connection, the prompt to accept or decline a print request, and when the print request is declined, transmitting an indication of the decline to the client device which prevents at least the transmitting, receiving and displaying steps from occurring. The transmitting the output file from the client device to the portable electronic device can include pushing the output file from the client device to the portable electronic device. The transmitting the output file from the client device to the portable electronic device can include pulling the output file from the client device to the portable electronic device.

FIG. 1 is a schematic representation of a non-limiting example of a portable electronic device such as a tablet computer 50 which can be used for as part of a document management system using printer emulation, as discussed in greater detail below. Tablet computer 50 is an example, and it will be apparent to those skilled in the art that a variety of different portable electronic device structures, other than tablet computers, can be used in other example embodiments. Indeed variations on tablet computing tablet computer 50 can include, without limitation, a cellular telephone, a portable email paging device, a camera, a portable music player, a portable video player, a personal digital assistant, a portable book reader, a portable video game player, a netbook computer, or a laptop computer. Furthermore, example variations include combinations of any of the above devices. Other example variations include devices which are not necessarily portable, such as desktop computers.

Referring to FIG. 1, tablet computer 50 includes a chassis 54 that supports a display 58. Display 58 can include one or more light emitters such as an array of light emitting diodes (LED), liquid crystals, plasma cells, or organic light emitting diodes (OLED). Other types of light emitters can be used. A touch-sensitive membrane 62 is overlaid on display 58 to thereby provide an input device for tablet computer 50. As a non-limiting example, tablet computer 50 can be configured to selectively show or hide a virtual keyboard 64. Other types of input devices can be provided on chassis 54, other than touch membrane 62, or in addition to touch membrane 62, can be used. For example, a physical keyboard, or touch-pad, or joystick or trackball or track-wheel, a microphone, or optical camera or any one or more of them can be provided, in addition to or in lieu of touch membrane 62. Such other components may, if desired, be "slide-out" components. In example implementation, tablet computer 50 also includes a speaker 66 for generating audio output. Speaker 66 may be implemented as, or augmented with, a wired or wireless headset or both.

Figure 2:
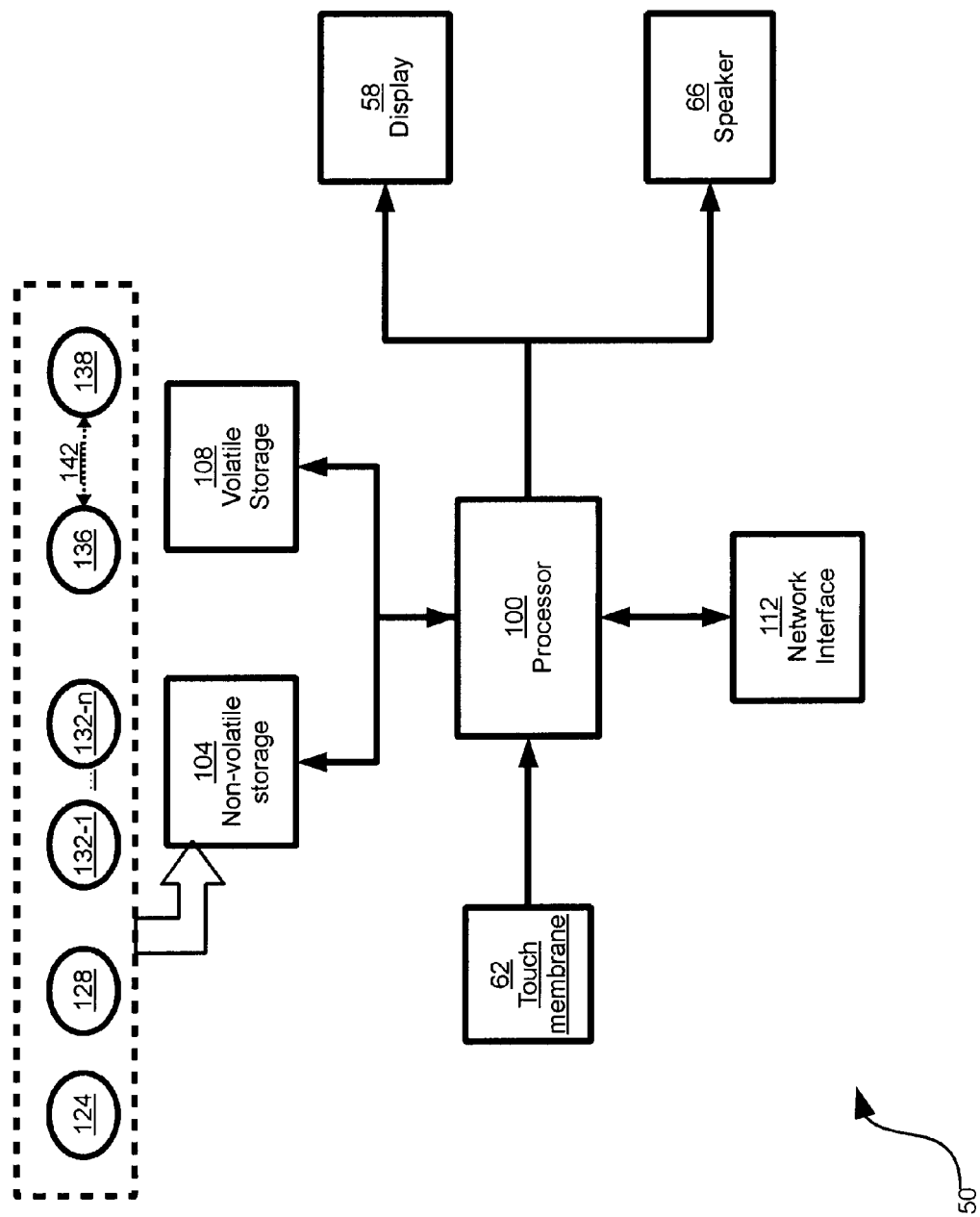
FIG. 2 is a block diagram of the electronic components of the tablet computer shown in FIG. 1.

FIG. 2 shows a schematic block diagram of the electronic components of tablet computer 50. It should be emphasized that the structure in FIG. 2 is a non-limiting example. In FIG. 2, tablet computer 50 includes an input device in the form of a touch membrane 62. (As discussed above, other input devices can be used even if not expressly discussed herein.) Touch membrane 62 has been discussed above.

Input from touch membrane 62 is received at a processor 100. In variations, processor 100 may be implemented as a plurality of processors or multi-core processors or both. Processor 100 can be configured to execute different programming instructions that can be responsive to the input received via the one or more input devices. To fulfill its programming functions, processor 100 is also configured to utilize electronic memory. Such electronic memory, in an example embodiment, includes at least one non-volatile storage unit 104 (e.g. Erasable Electronic Programmable Read Only Memory ("EEPROM"), Flash Memory) and at least one volatile storage unit 108 (e.g. random access memory ("RAM")).

Other configurations of electronic memory can be used. Programming instructions that implement the functional teachings of tablet computer 50 as described herein are typically maintained, persistently, in non-volatile storage unit 104 and used by processor 100 which makes appropriate utilization of volatile storage 108 during the execution of such programming instructions.

Processor 100 in turn is also configured to control display 58 and speaker 66 and any other output devices that may be provided in tablet computer 50, also in accordance with different programming instructions and responsive to different input received from the input devices.

Processor 100 also connects to a network interface 112, which can be implemented in example embodiment as a radio configured to communicate over a wireless link, although in variants tablet computer 50 can also include a network interface for communicating over a wired link. Network interface 112 can thus be generalized as a further input/output device that can be utilized by processor 100 to fulfill various programming instructions. Interface 112 is configured to correspond with the network architecture that defines such a link. Present, commonly employed network architectures for such a link include, but are not limited to, Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("COMA"), Evolution-Data Optimized ("EVDO"), Institute of Electrical and Electronic Engineers ("IEEE") standard 802.11, Bluetooth™ or any of their variants or successors. In an example embodiment, each network interface 112 can include multiple radios to accommodate the different protocols that may be used to simultaneously or individually communicate over different types of links.

As will become apparent further below, tablet computer 50 can be implemented with different configurations than described, omitting certain input devices or including extra input devices, and likewise omitting certain output devices or including extra output devices.

Tablet computer 50 is configured to maintain, within non-volatile storage 104, a printer service 124, a document manager 128, and optionally, one or more additional applications 132-1, . . . 132-n. (Generically, additional application 132, and collectively, additional applications 132. This nomenclature is used elsewhere herein.) Printer service 124, document manager 128 and additional applications 132 can be pre-stored in non-volatile storage 104 upon manufacture of tablet computer 50, or downloaded via network interface 112 and saved on non-volatile storage 104 at any time subsequent to manufacture of tablet computer 50.

Processor 100 is configured to execute printer service 124, accessing non-volatile storage 104 and volatile storage 108 as needed. As will be explained further below, printer service 124 is configured to emulate a traditional, paper-based printer such that tablet computer 50 can appear on a network as a printer to other devices connected to that network, so that documents can be virtually printed to tablet computer 50 and stored on non-volatile storage 104 or volatile storage 108 or both from other devices on the network.

Processor 100 is also configured to execute document manager 128, accessing non-volatile storage 104 and volatile storage 108 as needed. The implementation of document manager 128 is not particularly limited, but is generally configured to receive input instructions to browse and access any documents or files stored on tablet computer 50. In particular, virtually printed documents that are received via printer service 124 can be browsed and opened via document manager 128. Document manager 128 can be implemented as a file manager application, or can be part of a document reader or document editor application, or all of them.

Additional applications 132 can be any application that can be stored and executed according to the processor and other resources of tablet computer 50. Such additional applications 132 can also include their own document managers or can be document readers or can be any other type of application as well.

Tablet computer 50 is also configured to maintain a unique identifier 136 for identifying tablet computer 50 from other network devices, as will be discussed further below. Non-limiting examples of possible types of unique identifiers include a serial number for processor 100, or an International Mobile Subscriber Identity (IMSI). Other types of unique identifiers will now occur to those skilled in the art.

Furthermore, tablet computer 50 is also configured to maintain a portable account identifier 138 for associating the tablet computer with a user, as will be discussed further below. Non-limiting examples of possible types of portable account identifiers include an email address, or an International Mobile Subscriber Identity (IMSI). Other types of portable account identifiers will now occur to those skilled in the art.

As will be discussed in greater detail below, a relationship 142 can be established between portable account identifier 138 and unique identifier 136 which can be used to address print requests to tablet computer 50. The term relationship is used herein to refer to, in an example embodiment, a unique number that represents the pairing of portable account identifier 138 and unique identifier 136. Such a unique number may be a hash or a concatenation, or can be generated using any desired computing operation.

Figure 3:
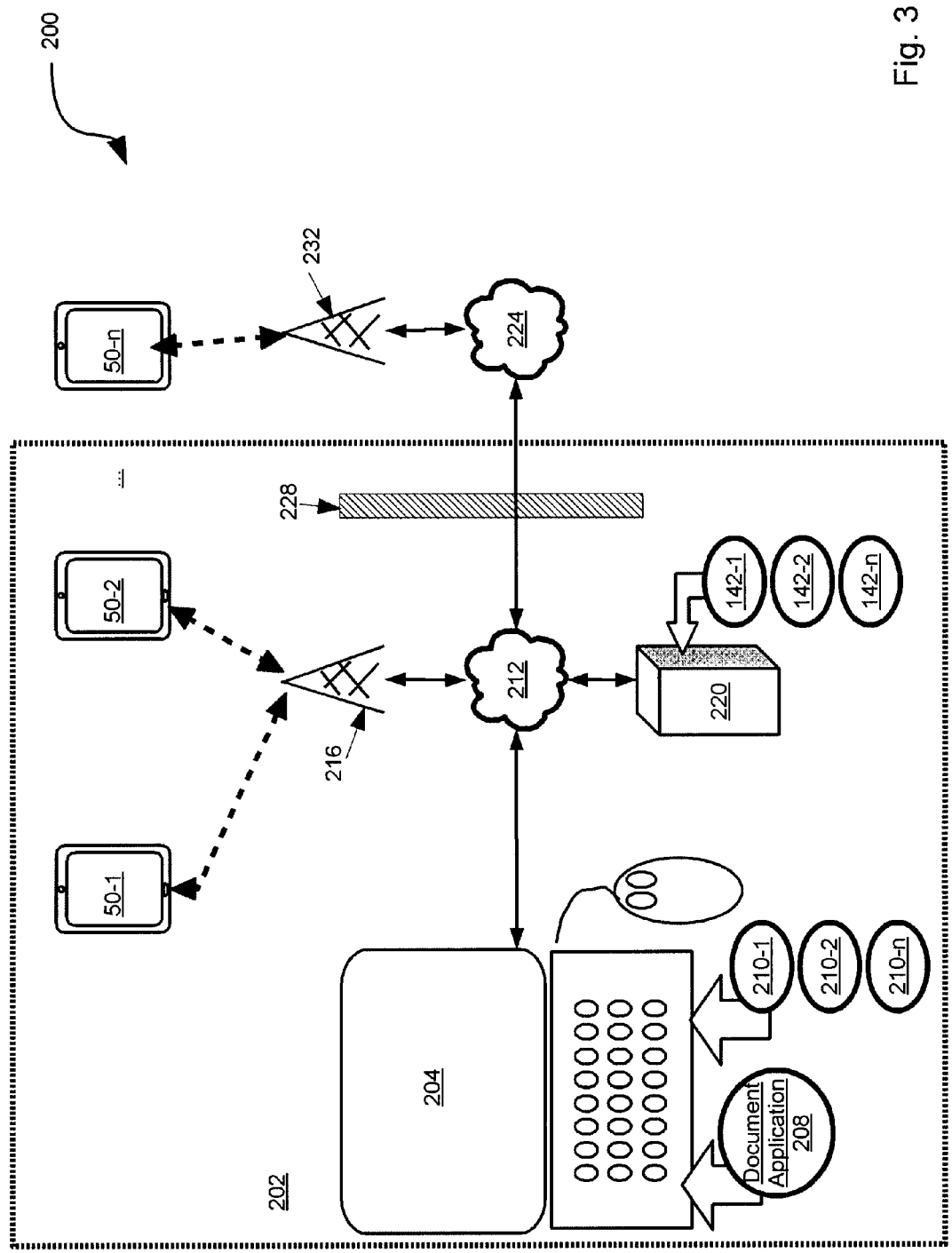
FIG. 3 shows an example system for document management incorporating a plurality of the devices of FIG. 1.

In FIG. 3, a document management system using printer emulation in accordance with another example embodiment is shown generally at 200. System 200 generally contemplates an enterprise configuration 202 that includes a plurality of tablet computers 50 that are all associated with an enterprise configuration 202.

Enterprise configuration 202 thus includes at least one computer 204, Computer 204, in example embodiments, is a computer that is not intended to be moved often, such as workstation computer, desktop computer or a server. However, in other example embodiments computer 204 may be portable and can include, without limitation, a cellular telephone, a portable email paging device, a camera, a portable music player, a portable video player, a personal digital assistant, a portable book reader, a portable video game player, a netbook computer, a laptop computer, or combinations of these devices.

Computer 204 is configured to execute a document application 208. The nature of document application 208 is not particularly limited, and can be, for example, a word processor, a spreadsheet editor, a web browser, a presentation creation application or any other application where a print function is included that permits generation of a document from documentation application 208 onto a printer (not shown).

The at least one computer 204 is also configured to maintain a virtual printer driver 210 respective to one or more of tablet computers 50. While FIG. 3 shows computer 204 maintaining a printer driver 210 respective to each tablet computer 50, computer 204 need not maintain a printer driver 210 for all tablet computers 50. Thus, document application 208 can also be used to send a print request to any tablet computer 50 that has its respective printer driver 210 installed on computer 204.

Printer driver 210 is generally configured to conform with specification for the operating system that is native to computer 204, thereby obviating the need to materially modify computer 204. By the same token output files generated using printer driver 210 are generally configured to conform with the computing environment of its respective tablet computer 50. Thus, printer driver 210 can be configured to include, the ability to define, on virtual-printing of a document from document application 208, various printing options, such as which pages to print, number of pages per sheet, watermarking, portrait vs. landscape mode, paper size, resolution, colour vs. grayscale vs. black-and-white, scaling, margins and the like. In certain implementations, the printer driver 210 could be configured to utilize a standard script such as Postscript. The options provided can also consider the computing environment of the destination tablet computer 50, such as screen size, screen resolution, available processing and memory resources, such that output file that is sent is optimized or otherwise consistent with that computing environment. Printer drivers 210 can also be configured to be processing-intensive such that output files generated at computer 204 are substantially completely rendered at computer 204 for display on the destination tablet computer 50. Alternatively, printer drivers 210 can be configured to consume as little processing resources as possible at computer 204 so that the majority of processing and rendering occurs at the destination tablet computer 50. Other aspects of printer drivers 210 will be discussed further below.

Enterprise configuration 202 also includes a private network 212 to which computer 204 can connect. Private network 212 also connects to an enterprise wireless base station 216 and an enterprise server 220, both of which are also associated with enterprise configuration 202. Private network 212 can also connect to various other computing devices (not shown), such as additional computers, or printers, or file servers, or print servers that are associated with the enterprise. Private network 212 also connects to a public network 224 through an enterprise firewall 228.

Private network 212 can be based on any known local area network architectures, such as the Internet Protocol (IP) network running over Ethernet. Wireless base station 216 is typically a wireless local area network (WLAN) base station utilizing IEEE standard 802.11 or one of its variants. Tablet computers 50 can all connect to private network 212 via wireless base station 216 using their respective network interfaces 112. In FIG. 3, only tablet computer 50-1 and tablet computer 50-2 are shown connected to wireless base station 216, but tablet computer 50-n can also connect to wireless base station 216. Typically, a given tablet computer 50 will associate with wireless base station 216 when in range of wireless base station 216.

As will be discussed further below, enterprise server 220 is configured to manage a network printer address for tablet computer 50 that is used to route a print request from computer 204 (or another computer) based on relationship 142 between portable account identifier 138 and unique identifier 136.

Public network 224 typically includes the Internet as well as interconnections with other types of public networks such as cellular telecommunication networks or Wi-Fi hotspots. Accordingly, one or more base stations 232 are connected to public network 224. Base station 232 can thus be based on core mobile telecommunication network protocols (E.g. 3G, EDGE, as discussed above) or can be based on WLAN architectures such as public mobile hotspots. In an example embodiment, a plurality of base stations 232 can be typically provided, any one or more of which can be associated with a given tablet computer 50. In FIG. 3, only tablet computer 50-n is shown connected to wireless base station 232, but tablet computer 50-1 or tablet computer 50-2 can also connect to wireless base station 232. Typically, a given tablet computer 50 will associate with wireless base station 232 when in range of wireless base station 232, and utilize that association when that tablet computer 50 is not within range of wireless base station 216.

Figure 4:
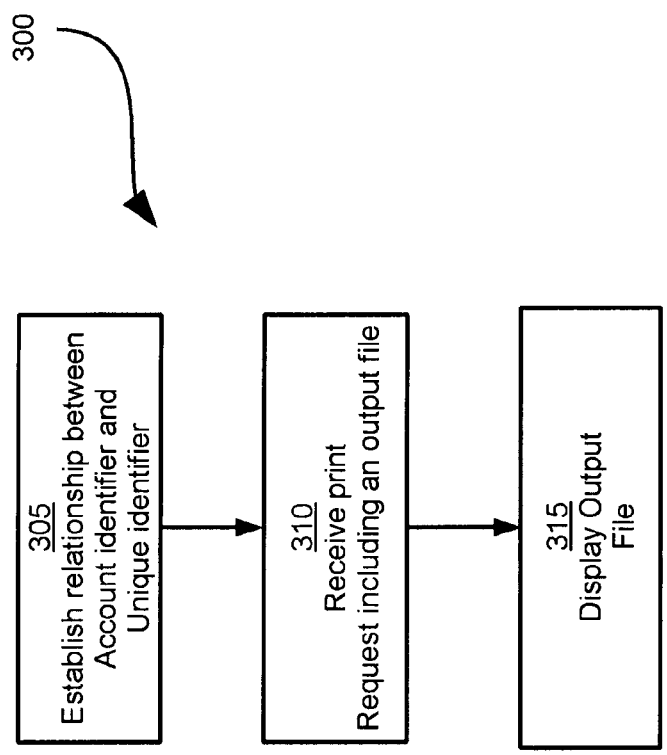
FIG. 4 shows a flowchart depicting an example method for document management.

In FIG. 4, a flowchart depicting a method for document management using printer emulation is indicated generally at 300. Method 300 is one example in which printer service 124 on the tablet computer 50 can be implemented. It is also emphasized that the method 300 can be varied and that the method 300 need not be performed in the exact sequence as shown. To assist in discussion of method 300, a specific example to its performance will be discussed in relation to tablet computer 50 and system 100.

Block 305 includes establishing a relationship in electronic memory between a portable account identifier and a unique identifier. In tablet computer 50, block 305 includes establishing relationship 142 between unique device identifier 136 and portable account identifier 138. Block 305 can be performed once when tablet computer 50 is originally provisioned with an account (not shown), such provisioning including associating the unique device identifier 136 of tablet computer 50 with the portable account identifier 138. Relationship 142 can subsequently be terminated, and that portable account identifier 138 can be associated with other tablet computers 50.

Block 310 includes receiving a print request over a network. In system 100, the print request originates from computer 204. The print request includes an output file. The print request is created from document manager 208 using the printer driver 210 maintained on computer 204 that is associated with its respective tablet computer 50. The network printer address for the tablet computer 50 that is used to route the print request is managed by server 220 based on the relationship between the portable account identifier and the unique identifier. The methods by which server 220 manages the network printer address is not particularly limited, and various non-limiting examples of such management will be discussed below.

In tablet computer 50, the print request is received at print service 124 of tablet computer 50.

Block 315 includes displaying the output file that was part of the print request at block 310. In tablet computer 50, block 315 can be effected by print service 124 transferring the output file received at block 315 to the document manager application 128 within tablet computer 50. When the document manager application 128 is executed on processor 100, then the output file is generated on display 58 under the control of processor 100. It will thus be apparent that block 315 need not occur immediately and that the output file can be stored on tablet computer 50 until such time as block 315 is invoked.

Figure 5:
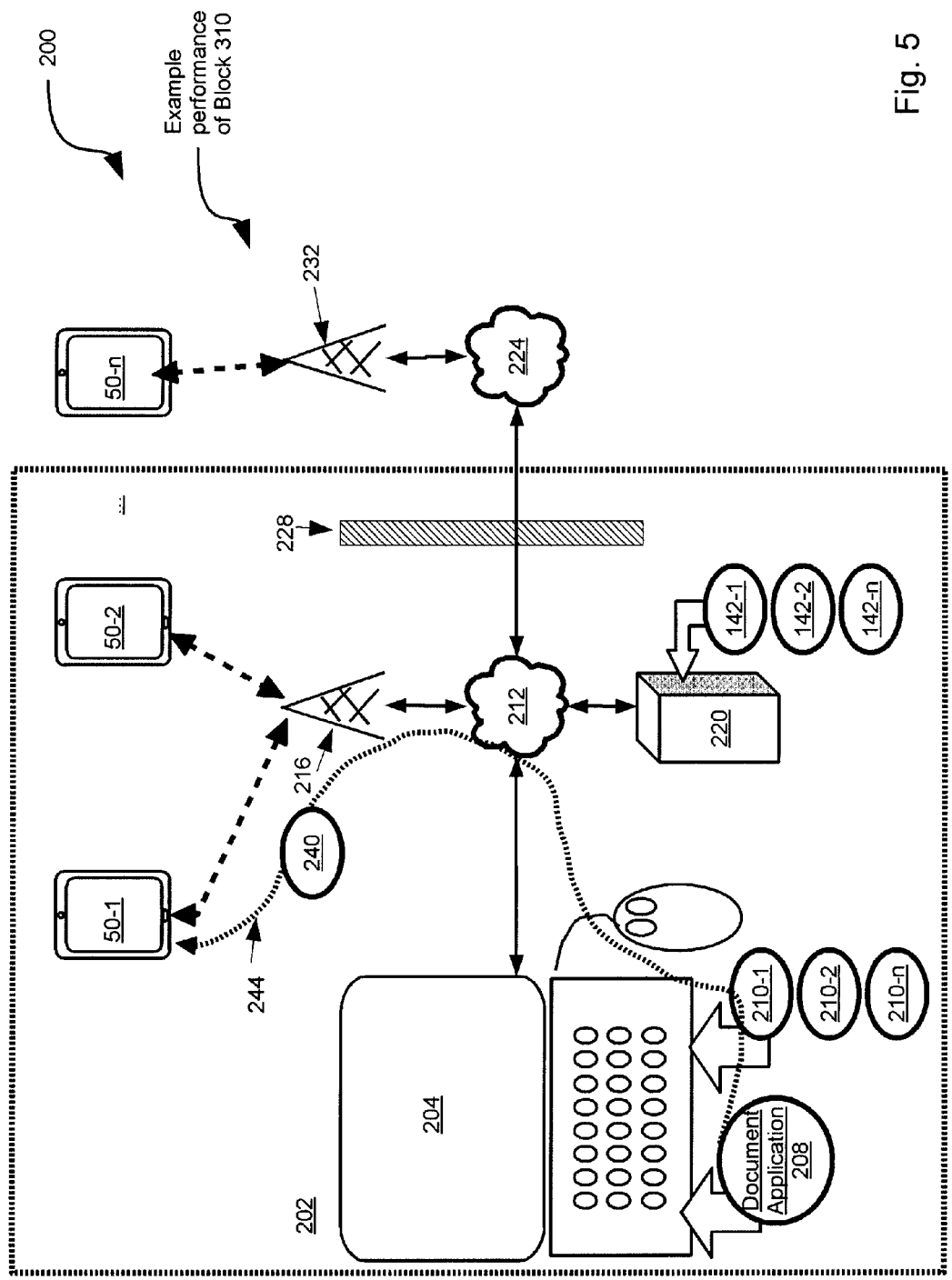
FIG. 5 shows a variation on the system of FIG. 3 providing an example of in which block 310 of the method of FIG. 4 can be implemented.

The methods by which server 220 manages the network printer address used to send print requests from computer 204 to a given tablet computer 50 is not particularly limited. FIG. 5 shows one example of how block 310 can be implemented. In FIG. 5, system 200 is shown with a print request 240 being sent from document application 208 directly to tablet computer 50-1 via printer driver 210-1 along a pathway 224. Pathway 224 thus contemplates that print request 240 is addressed directly to tablet computer 50-1. Thus, in FIG. 5, printer driver 210-1 is equipped with the direct network printer address of tablet computer 50-1 by server 220.

Figure 6:
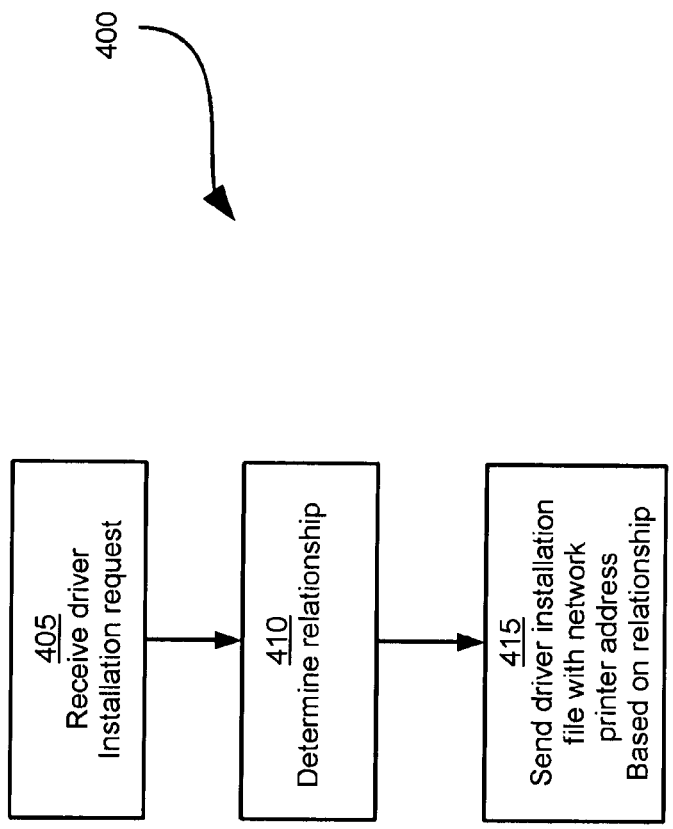
FIG. 6 shows a flowchart depicting an example method for installing a printer driver on a computer.

In FIG. 6, a flowchart depicting a method for virtual printer driver installation is indicated generally at 400. Method 400 thus contemplates one example in which driver 210-1 that utilizes pathway 244 of FIG. 5 can be installed on computer 204. In example embodiments, method 400 can be varied and that the method 400 need not be performed in the exact sequence as shown.

Block 405 thus includes receiving a driver installation request. The driver installation request can be effected using printer driver installation wizards that are native to the operating system used on computer 204. For example, in a Windows XP™ environment, the "Add Printer Wizard" can be used can be used to browse for a network printer. This example implementation is useful because no third-party software or application needs to be installed on computer 204 in order to install the printer driver 210, thereby providing an implementation for system 200 without modifying computer 204 except to provide computer 204 with a printer driver that conforms with the operating system specifications for computer 204.

Server 220 is configured to host virtual representations of the print service 124 for each tablet computer 50 that are browsable by computer 204 over private network 212. (However, browsing is only one such example in which native printer driver installation wizards may be utilized.) Such browsing may be either directly to server 220, or via another server (not shown) that hosts a directory of printers available to computer 204.

Figure 7:
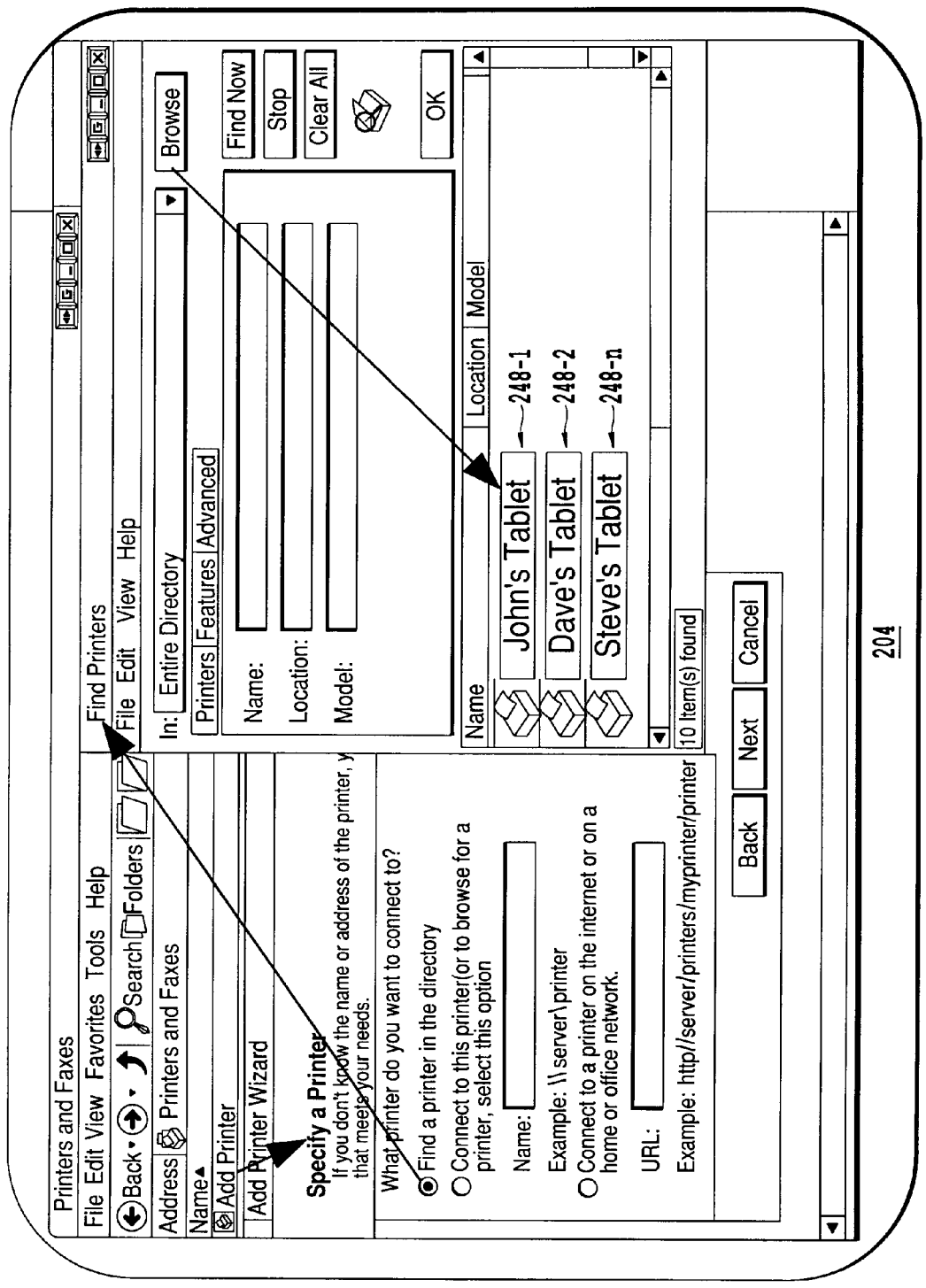
FIG. 7 shows an example graphical interface that can be generated on the computer as part of performance of the method of FIG. 6.

FIG. 7 shows an example graphic interface that can be generated on the display of computer 204 using the standard Windows XP™ "Add Printer Wizard", to browse a printer network directory, and ultimately generate a driver installation request consistent with block 405. In the example of FIG. 7, three virtual printers are offered according to the native Windows XP environment, with account labels 248 under the "Name" column. (Again, the example in FIG. 7 can be modified to work with other operating systems including other Windows operating systems, or Linux operating systems, or MACOS operating systems, or others). Specifically account label 248-1 reads "John's Tablet", account label 248-2 reads "Dave's Tablet" and account label 248-n reads "Steve's Tablet". (Other printers or virtual printers connected to network 212 which are part of the directory can also be shown).

For discussion purposes, Table I provides an example initial relationship between the virtual printers as labeled in FIG. 7 and tablet computers 50, the contents of Table I being maintained by server 200.

TABLE I

First Example of Accounts, Identifiers and Relationships

| ACCOUNT LAYER | | DEVICE LAYER | | RELATIONSHIP LAYER |
|---|---|---|---|---|
| Account Label 248 | Account Identifier 138 | Tablet Computer 50 | Unique Identifier 136 | Relationship 142 |
| Label 248-1 ("John's Tablet") | 138-1 | 50-1 | 136-1 | 142-1 |
| Label 248-2 ("Dave's Tablet") | 138-2 | 50-2 | 136-2 | 142-2 |
| Label 248-n ("Steve's Tablet") | 138-n | 50-n | 136-n | 142-n |

As emphasized above, Table I represents an initial relationship, but it is contemplated that such relationships can change and be dynamically accommodated such that the risk of a document being virtually printed to an incorrect tablet computer 50 is reduced or mitigated. Thus, the "Account Label 248" column refers to the labels shown in FIG. 7, and which in turn are associated in a fixed relationship with specific account identifiers 138 which are listed in the "Account identifier 138" column, and thus the "Account Label 248" column and the "Account identifier 138" column appear under the heading "Account Layer".

The "Tablet Computer" column refers to three tablet computers 50 shown in system 200 in FIG. 3 and FIG. 5 and elsewhere, which are in turn associated in a fixed relationship with the specific unique identifiers 136 which are listed in the "Unique Identifier 136" column, and thus the "Tablet Computer 50" column and the "Unique Identifier 136" column appear under the heading "Device Layer".

The "Relationship 142" column refers to the specific relationship between various accounts and devices and it is this relationship that can change.

Returning now to the discussion of block 405 of method 400, assume that an instruction is received at computer 204 selecting "John's Tablet", to thereby generate a printer driver installation request in that is finally received at server 220. Accordingly, block 410 includes determining a relationship between the account label within the driver installation request and a particular tablet computer. Continuing with the example, based on an examination of Table I, relationship 142-1 applies in that "John's Tablet" is associated with tablet computer 50-1.

Block 415 includes sending the driver installation file with a network printer address for the tablet computer 50 as determined based on the relationship at block 410. Continuing with the example, driver 210-1 will be sent from server 220 to computer 204 and which will include a network address for virtually printing directly to device 50-1 utilizing pathway 244 of FIG. 5. Once received at computer 204, printer driver 210-1 can be installed locally on computer 204 according to the printer driver installation methods native to the operating system of computer 204.

Having completed block 415, method 300 can be performed according to the specific example performance of block 310 in FIG. 5 as discussed above. As discussed above, however, the contents of Table I may change such that relationships 142 may no longer apply. The result is that there is a possibility of a document being printed from document application 208 to an incorrect tablet computer 50. This can be particularly of concern if the documents being generated are of a sensitive or confidential nature. For example, assume that tablet computer 50-1 is lost or stolen. Accordingly, Table II shows an example of how Table I is updated in server 220 to reflect that tablet computer 50-1 is no longer associated with enterprise configuration 202.

TABLE II

Second Example of Accounts, Identifiers and Relationships (Updated from Table I)

| ACCOUNT LAYER | | DEVICE LAYER | | RELATIONSHIP LAYER |
|---|---|---|---|---|
| Account Label 248 | Account Identifier 138 | Tablet Computer 50 | Unique Identifier 136 | Relationship 142 |
| Label 248-1 ("John's Tablet") | 138-1 | NONE | NONE | NONE |

TABLE II-continued

Second Example of Accounts, Identifiers
and Relationships (Updated from Table I)

| Account Label 248 | ACCOUNT LAYER Account Identifier 138 | DEVICE LAYER Tablet Computer 50 | Unique Identifier 136 | RELATION-SHIP LAYER Relationship 142 |
|---|---|---|---|---|
| Label 248-2 ("Dave's Tablet") | 138-2 | 50-2 | 136-2 | 142-2 |
| Label 248-n ("Steve's Tablet") | 138-n | 50-n | 136-n | 142-n |

Thus, when method 400 is performed when Table II is maintained in server 200, it will not be possible to install a printer driver associated with "John's Tablet" and account identifier 138-1, thereby blocking the ability to send a printer output file from computer 204.

In another scenario, however, Table I may be updated to Table II after printer driver 210-1 has already been installed on tablet computer 50-1, leading to the possibility that computer 204 could still be used to send a confidential or sensitive document to tablet computer 50-1 resulting in unauthorized access to that document. In example embodiments, various controls can be used to mitigate or reduce the likelihood of such unauthorized access occurring.

One technique contemplates that printer service 124 is configured to verify that its local relationship 142 is valid before accepting or processing print request 240. Thus a copy of relationship 142 can be included in print request 240 and then upon receipt of print request, printer service 124 will verify that the relationship 142 received in the print request 240 matches the relationship 142 stored locally on the tablet computer 50-1. Thus, according to this technique, tablet computer 50-1 can be remotely wiped using existing techniques such that account identifier 138 and relationship 142 are deleted from tablet computer 50-1 during the remote wipe, so that printer service 124 will fail to validate the relationship and printer service 142 refuses to accept the print request. Another variation contemplates that the printer network address is itself managed by printer service 124, and thus the remote wipe will automatically render the tablet computer 50-1 unaddressable in the print request 240. A still further technique contemplates the use of an encryption methodology based on relationship 142, such that the printer driver 210 will utilize relationship 142 as part of encryption key to generate print request 240. Relationship 142 can be used as the encryption key itself, thus, the wiping of relationship 142 from tablet computer 50-1 will result in the wiping of the encryption key. Additional security can be provided by having relationship 142 be an index to an decryption key that is generated elsewhere (e.g. server 220) and then stored on tablet computer 50-1, (with the corresponding encryption key being incorporated directly into printer driver 210-1), again such that the decryption key is wiped upon a remote wipe of tablet computer 50-1.

Figure 8:
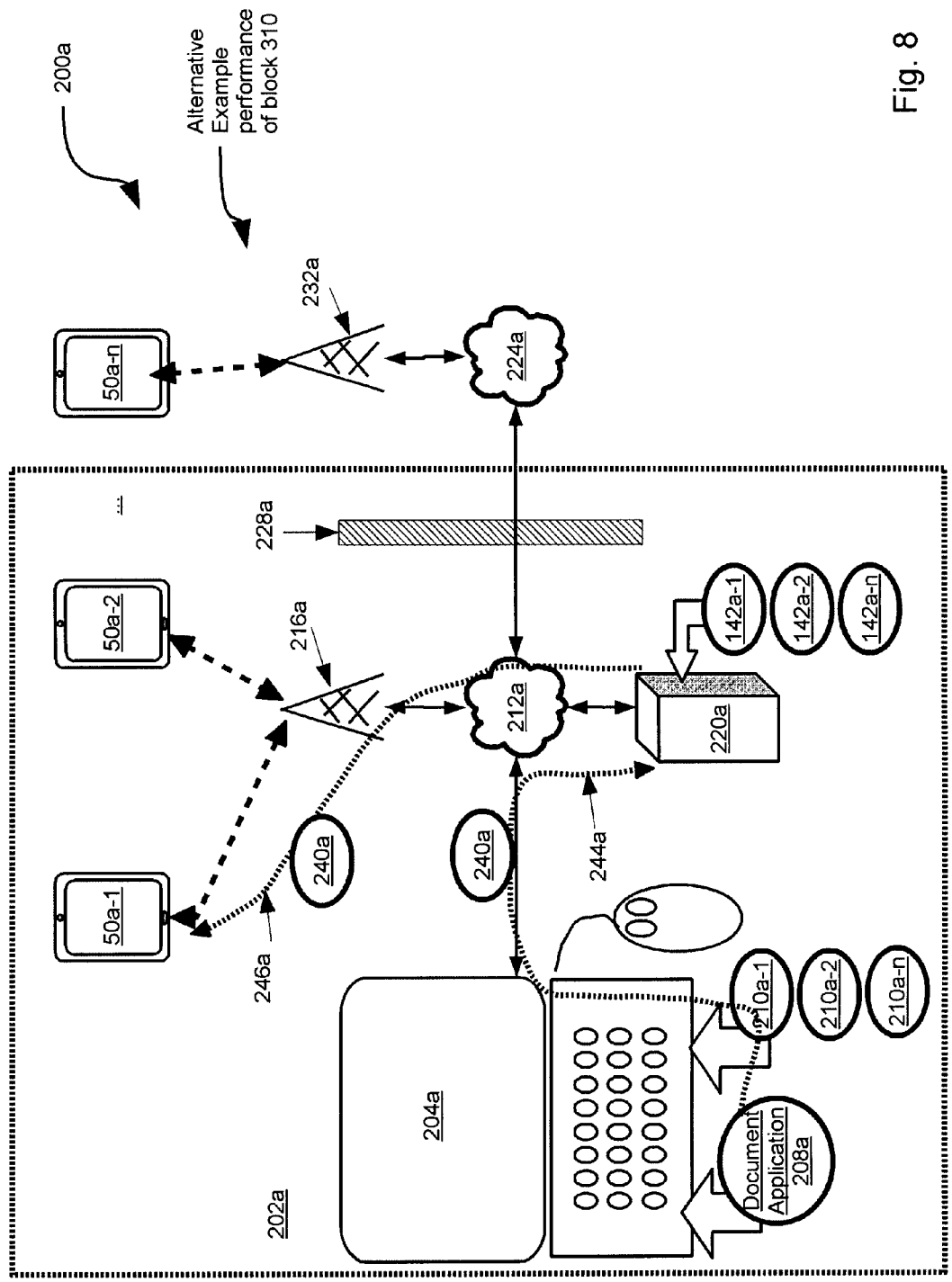
FIG. 8 shows another variation on the system of FIG. 3 providing another example in which block 310 of the method of FIG. 4 can be implemented.

In FIG. 8, another system for document management is indicated generally at 200a. System 200a is a variation on system 200 and thus like references bear like elements except followed by the suffix "a". System 200a can use another approach to implementing block 310, whereby print requests 240a are always carried through server 220a. In this manner, further security can be afforded without concern about the state of the printer driver 210a as installed on computer 204a, since the validity of all print requests are centrally administered by server 220a. Indeed, when Table I changes to Table II, server 220a can be configured to simply refuse print requests from computer 204a and return an error to computer 204a. Furthermore, when there is a change of one account to another tablet computer 50a, then an installed printer driver 210a need not necessarily be updated, but rather server 220a will automatically route the print request 240a associated with one account to the new tablet computer 50a.

In a further variation, server 220a can be configured to locally host a print service 124 for each tablet computer 50a, and then to send the document to the document manager 128 on the destination tablet computer 50a, thereby obviating the need for a print service 124 on each tablet computer 50a and facilitating the use of example embodiments disclosed herein on legacy tablet computers 50a or other legacy computer devices. In this example, the output file can be converted to an email attachment that is sent to the correct tablet computer 50a as an email attachment (e.g. as a PDF, TIFF, JPG or other standard image file) to document manager 128 or other application within the destination tablet computer 50a.

Usefully, the functionality of server 220a can be incorporated directly into existing enterprise servers, such as an Microsoft Exchange Server, or a BlackBerry Enterprise Server, leveraging off of existing infrastructure in the existing enterprise server. Furthermore different layers of encryption can be provided between computer 204a and server 220a, or between server 220a and tablet computers 50a.

Figure 9:
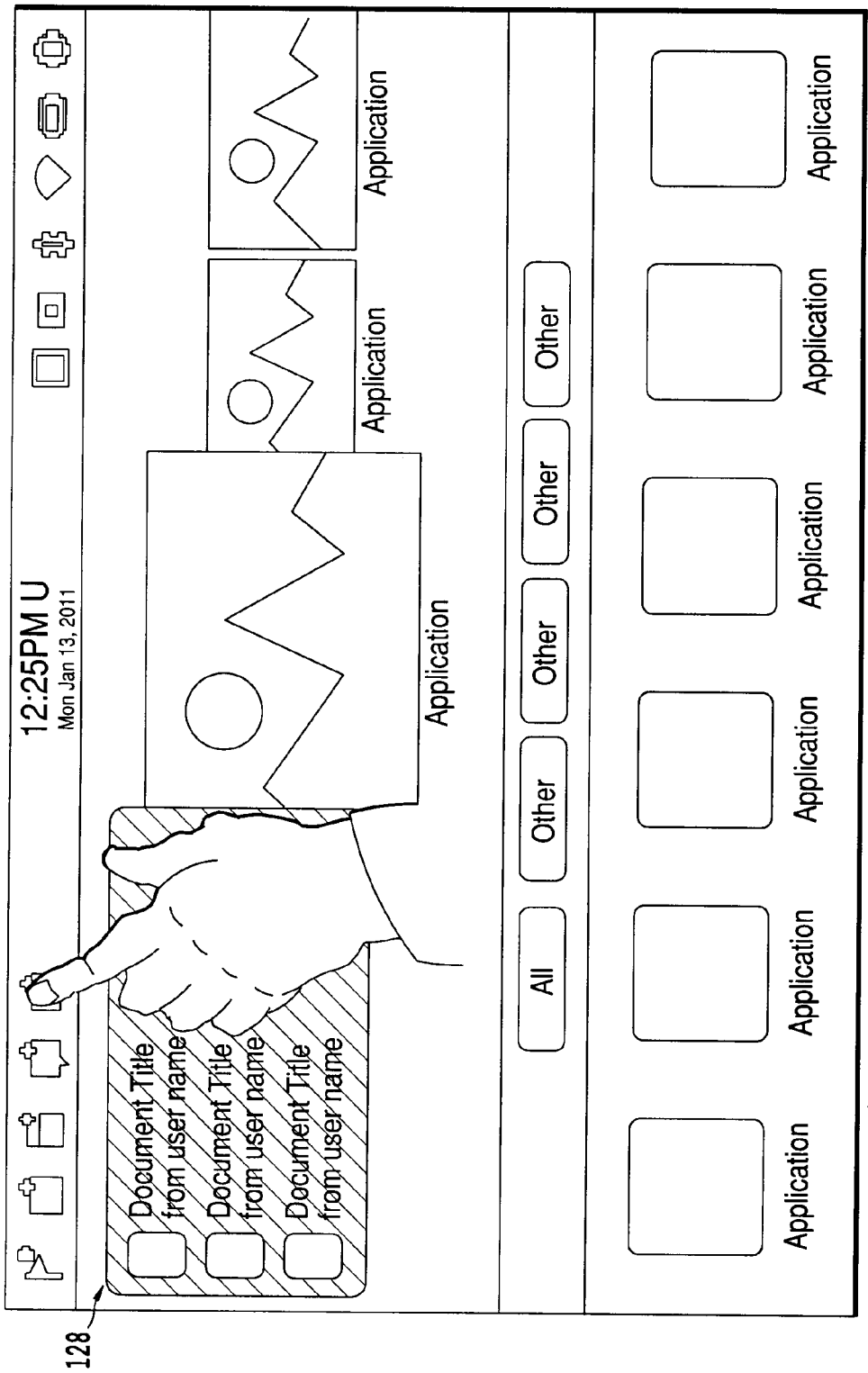
FIG. 9 shows an example of a document manger application on a display of the tablet computer of FIG. 1 that can be used to browse documents received on the tablet computer using the method of FIG. 3 or its variants.

FIG. 9 shows an example of a document manager application on a display of the tablet computer of FIG. 1 that can be used to browse documents received on the tablet computer using the method of FIG. 3 or its variants.

Figure 10:
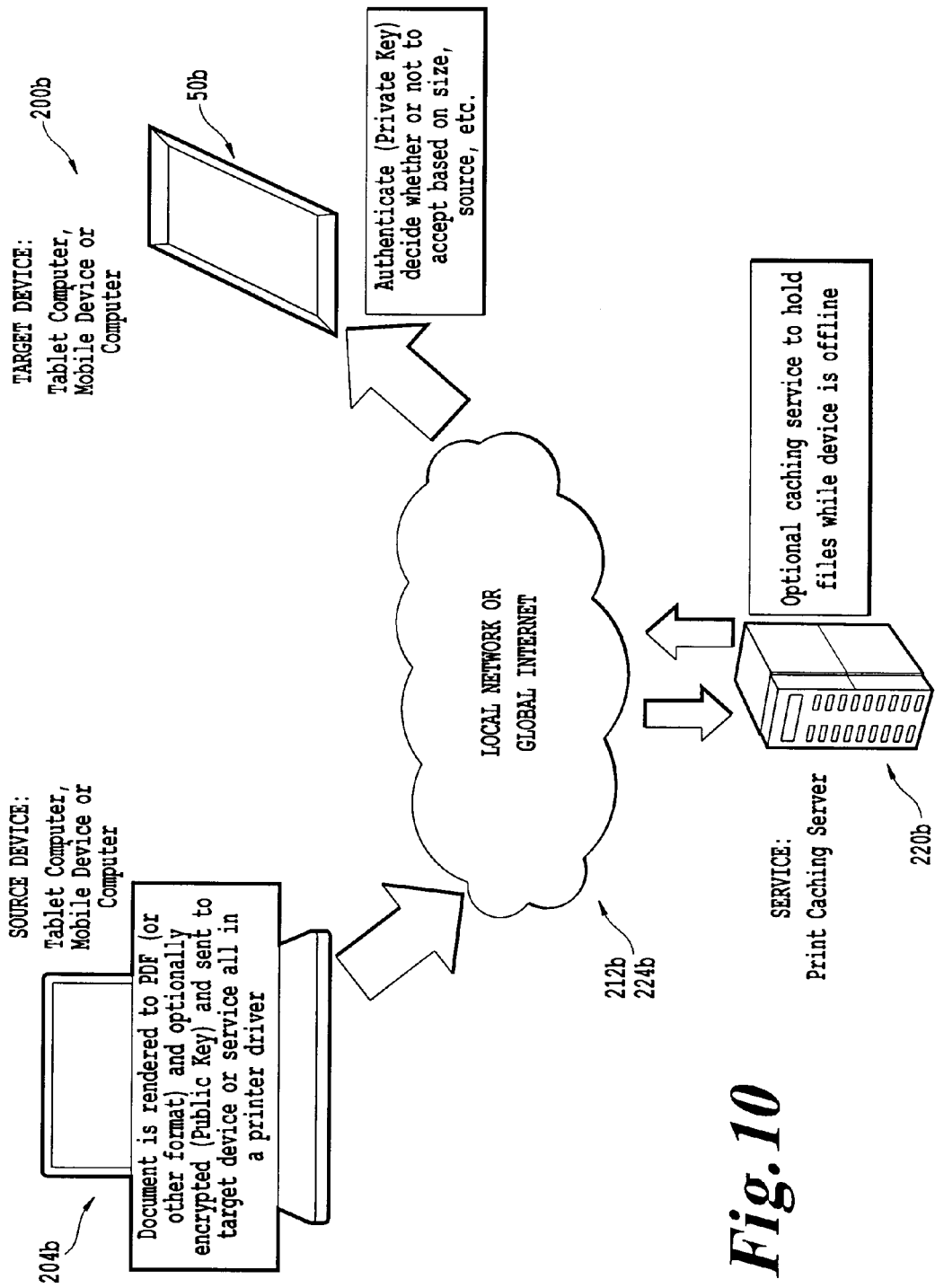
FIG. 10 shows another example system for document management.

FIG. 10 shows another example system for document management indicated generally at 200b. System 200b is a generalized version of system 200. System 200b contemplates, amongst other things, that server 220b can optionally be used to cache or spool output files received from computer 204b destined for tablet 50b when tablet 50b is offline.

Certain other general features can be used in variations. For example, in a less secure context tablet 50 can be configured to advertise itself as an available printer on a network bypassing server 220 altogether. As another example, tablet 50 can be configured with near field communication apparatuses which can be detected by computer 204 and used to obtain and establish a printer driver 210.

As another example, tablet 50 can be configured to send an email or other electronic communication to computer 204. Such an electronic communication can be configured to include a dedicated printer driver 210, or a link to such a dedicated printer driver 210. Upon receipt of the electronic communication computer 204 can be configured to utilize the electronic communication to install the dedicated printer driver 210.

For added security, temporary public encryption keys can be used to install the printer, drivers 210. Alternatively, such encryption keys can be configured to permit a "single print" from the computer 204 and thereafter be unusable for sending printed files directly to tablet 50. (E.g. the printer driver 204 expires after one print). In the case of the temporary key, printer driver 204 can be configured to remove itself from the list of printer devices after expiry.

Alternatively, once paired, the target appears as a printer on the source device until it is removed.

Alternatively, tablet computer 50 can be configured to require or automatically accept submitted files to include source signature authentication.

Tablet computer 50 can also be configured to send a notification warning that print request 240 is being sent. Alternatively, or in addition, tablet computer 50 can be configured to automatically accept or deny the print request 240 based on characteristics such as file size, format etc. Such a notification can be sent by email, text message or the like. Likewise a notification can also be sent to computer 204.

In another variation, server 220 can be configured to receive a print request 240 from computer 204, and then configured to in turn send that print request 240 to a plurality of different tablet computers 50, caching the print request 240 until a particular tablet computer 50 comes back on line. Most general case of this could be a print to email service Computer 204 can also be configured to, via the printer driver 210 or other methods, to print the file with a hash of the file encoded with its private key so that tablet computer 50 can confirm that it does come from a known source via the public key for that computer 204. Computer 204 can also be configured to receive a fax on behalf of a given tablet computer 50 and then to send that fax as a print requests 240 to the tablet computer 50.

In a further example variation, the Wi-Fi Direct™ or similar technology enabling Wi-Fi devices to connect directly, for operations such as printing, sharing, synching and displaying.

In yet a further example variation, Bluetooth™ or similar technology enabling Bluetooth™ enabled devices to connect directly can be used for operations such as printing, sharing, synching and displaying.

In yet further example variations, any other suitable technology for connecting devices can be used for operations such as printing, sharing, synching and displaying including, but not limited to, wired and wireless connections. Wired USB (Universal Serial Bus) connections are within the scope of example implementations.

Figure 11:
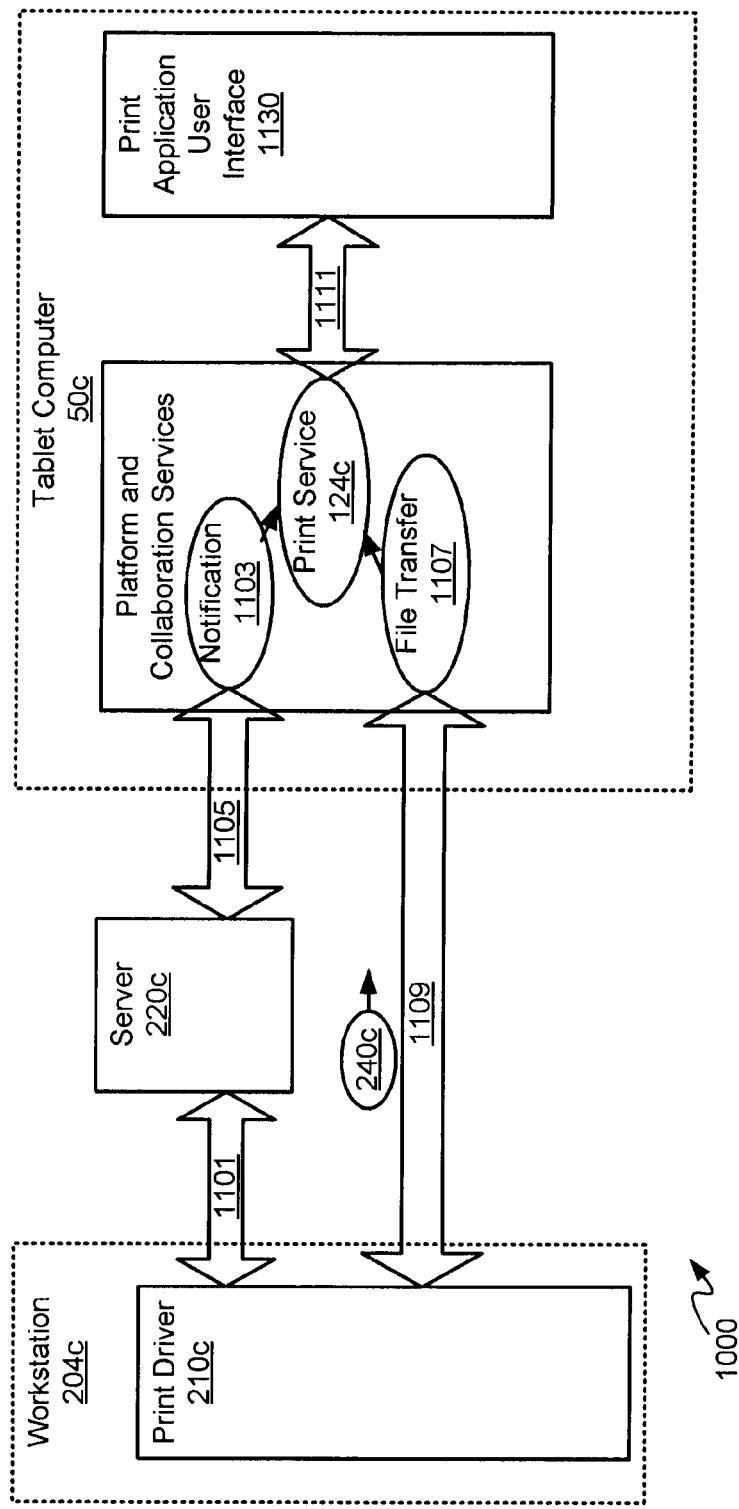
FIG. 11 shows another example system for document management.

FIG. 11 shows another example system 1000 for document management indicated generally at 200c. System 200c is a generalized version of system 200, and thus like references bear like elements except followed by the suffix "c". Print Driver 210c of computer 2014c is in communication with server 220c via a link 1101, while server 220c is in communication with a notification application 1103 at tablet computer 50c via a link 1105. Printer driver 210c is also in communication with a file transfer application 1107 at table computer 50c via a link 1109. Each of notification application 1103 and file transfer application 1107 are in communication with print service 124c, which in turn is in communication with a print application user interface 1130 via a link 1111 internal to tablet computer 50c.

In example embodiments, each of links 1101, 1105, 1109 include any suitable components of system 200 (i.e. network 212, base station 216 and the like) and can include a combination of wireless and wired components as desired.

In example embodiments, each of links 1101, 1105, 1109 can be implemented according to any suitable protocol. In specific non-limiting example implementations, link 1101 can be implemented according to REST (REpresentational State Transfer) protocol, while link 1105 can be implemented according to TLS (Transport Layer Security Protocol) protocol, and link 1109 can be implemented according to any suitable peer-to-peer protocol. In an example embodiment, each of links 1101, 1105, 1109 can be implemented according to SIP (Session Initiation protocol) protocol. Link 1111 can be implemented according to any suitable protocol.

Notification application 1103 (also referred to herein as notification 1103) includes an application for implementing the printing process of method 300. For example, notification 1103 can be enabled to provide notification to, for example print service 124c, that server 220c and/or computer 204c is waiting for tablet device 50c to perform an action and hence cause tablet computer 50c to perform an action such as pull print request 240c from computer 204c, as will presently be explained.

Similarly, file transfer application 1107 (also be referred to herein as file transfer 1107) includes an application for receiving print request 240c, such as a web server application and providing print request 240c to print service 124c.

In some implementations, print service 124c includes one or more of notification 1103 and file transfer 1107, while in other implementations each of print service 124c, notification 1103 and file transfer 1107 can include separate modules at tablet computer 50c each enabled to interact with one another. In any event, print service 124c, notification 1103 and file transfer 1107 include platform and collaboration services at tablet computer 50c, in an example embodiment.

Print application user interface (PAUI) 1130 includes a user interface application 1130 for providing printing options at tablet computer 50c. In example implementations, PAUI 1130 enables a user interface to be provided at a display of tablet computer 1130 for presenting options to accept or decline a print request as will be explained hereafter.

In some example implementations, print service 124c, notification 1103 and file transfer 1107 can use an underlying SIP infrastructure associated with other applications (e.g. applications 132) at tablet computer 50c. For example, one of other applications at tablet computer 50c can include a communications application, such as a voice applications, a texting applications, a video chat application, or the like, which uses SIP to communicate with other devices to establish communication sessions there between, including but not limited to multimedia communication sessions. In an example embodiment, print service 124c, notification 1103 and file transfer 1107 can use the same underlying communication infrastructure for notification and data (i.e. file) transfer as the communications application.

For example, as will be presently be explained, part of the notification process is providing to both computer 220c and tablet computer 50c private data associated with one or the other of each, including but not limited to network addresses such as IP (internet protocol) addresses. Hence, SIP can be used to confirm aspects of the communications as in SIP devices dialogue (e.g. like a phone call); the dialogue can include a user interaction, for example with tablet computer 50c via PAUI 1130, to confirm the communications.

Figure 12:
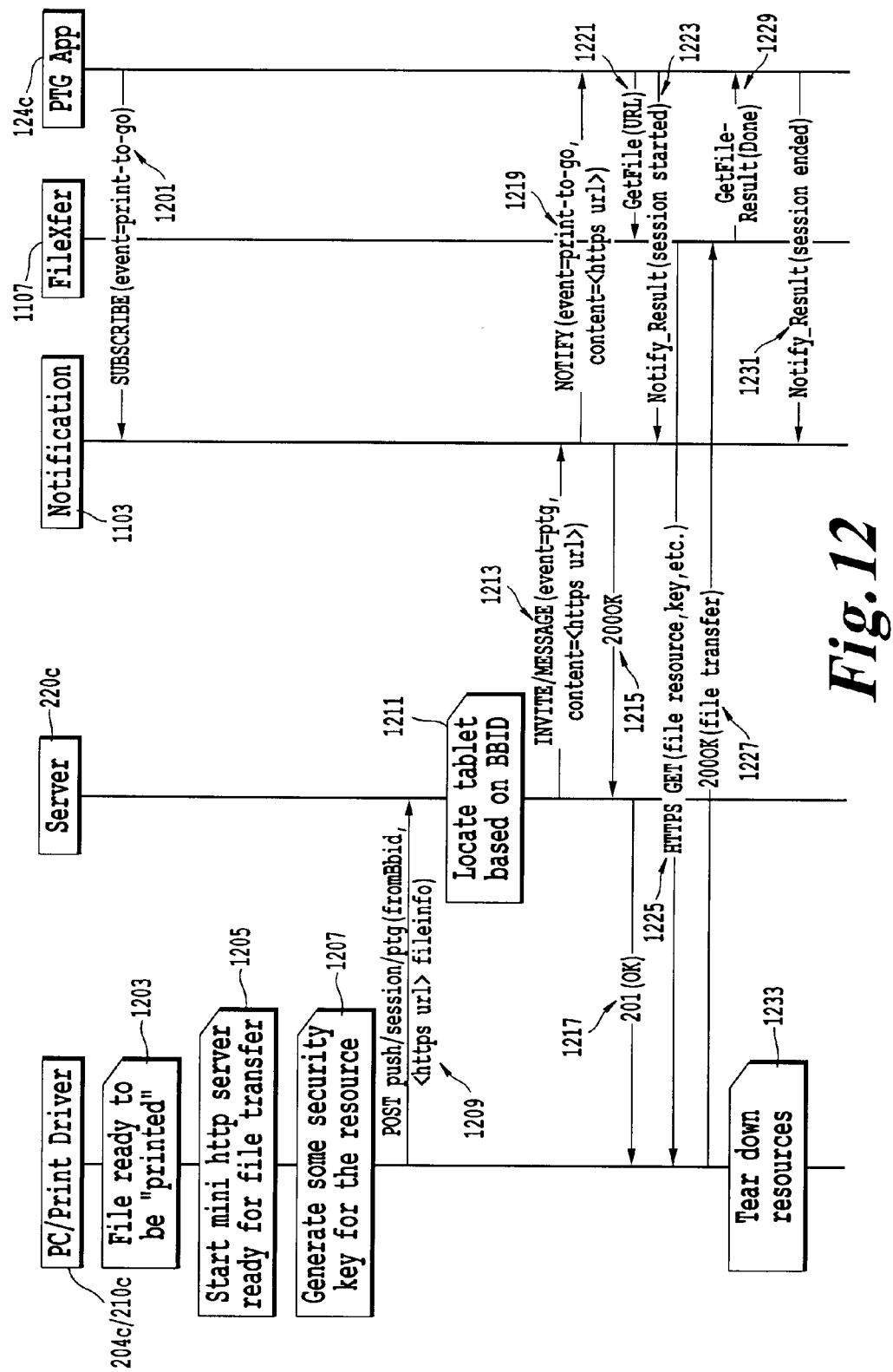
FIGS. 12-14 show communication diagrams illustrating example methods for document management.

FIG. 12 which depicts a diagram of communications between print driver 210c at computer 204c, server 220c and print service 124c, notification 1103 and file transfer 1107 at tablet computer 50c in implementation where a "pull" process is implemented, in which tablet computer 50c pulls print request 240c from computer 204c. In example embodiments, communications between computer 204c, server 220c and tablet computer 50c can occur according to any suitable protocol and/or combination of protocols, including but not limited to SIP protocols.

At 1201, print service 124c subscribes to events at notification 1103. At 1203, print driver 210c at computer 210c determines that a file is ready to be "printed" (i.e. printed to tablet computer 50c), for example print request 240c. In specific non-limiting implementations, at 1205, computer 104c causes a "mini" HTTP (Hypertext Transfer (or Transport) Protocol) server to be processed to assist in file transfer. At 1207, computer 204c generates a suitable security key, for example the encryption key described above.

At 1209, computer 204c posts a URL (uniform resource locator) of the mini HTTP server to server 220c (e.g. via link 1101), as well as any suitable identifier of tablet computer 50*c* ("BBID"), such as an identifier 136 described above, and information identifying the file to be printed. The post at 1209 can include the security key generated at 1207. At 1211, server 220*c* locates tablet computer 50*c* via the identifier of tablet computer 50*c*, and at 1213 transmits an invite message to notification 1103 at tablet computer 50*c*, for example via link 1105, which can also include the security key. In these example implementations server 220*c* is configured to manage a network printer address for tablet computer 50*c* that is used to route print data from computer 204 (or another computer) as described above.

Notification 1103 transmits a "200OK" message back to server 220*c* at 1215, which in turn transmits a "201OK" message back to computer 204*c*, each of which indicate that the invite message at 1213 was received at tablet computer 50*c*.

At 1219, notification 1103 notifies print service 124*c* of receipt of the invite message, as well as an address (i.e. the URL) of the HTTP mini server at which print request 240*c* can be retrieved. The notify event at 1219 is in response to the subscribe event at 1201.

In any event, at 1221, print service 124*c* issues a get file command to file transfer 1107 which includes the address (e.g. the URL) of the HTTP mini server at computer 204*c*. At 1223, print service 124*c* further issues a notify message to notification 1103 indicating that a session for receiving print request 240*c* has started.

At 1225, file transfer 1107 transmits a get message (e.g. an HTTPS GET command) to print driver 210*c* at computer 204*c*, for example via link 1109, using the address of the HTTP mini server. The get message at 1225 can include the security key received at 1213 such that computer 204*c* can verify that the get message is being received from the resource to which printing was intended. At 1227, computer 204*c* transmits a "200OK" message back to file transfer 1107 which includes print request 240*c*. Hence, when 1227 occurs, print request 240*c* is received at tablet computer 50*c* such that the associated document can be viewed, as described above.

At 1229, file transfer 1107 informs print service 124*c* that print request 240*c* has been received, and at 1231 print service 124*c* informs notification 1103 that the session has ended. At 1233, computer 204*c* tears down the resources used for the print to tablet computer 50*c* process, for example the mini HTTP server.

In these example implementations, server 220*c* is enabled to negotiate the notification process and that tablet computer pulls print request 240*c* from computer 204*c*.

Figure 15:
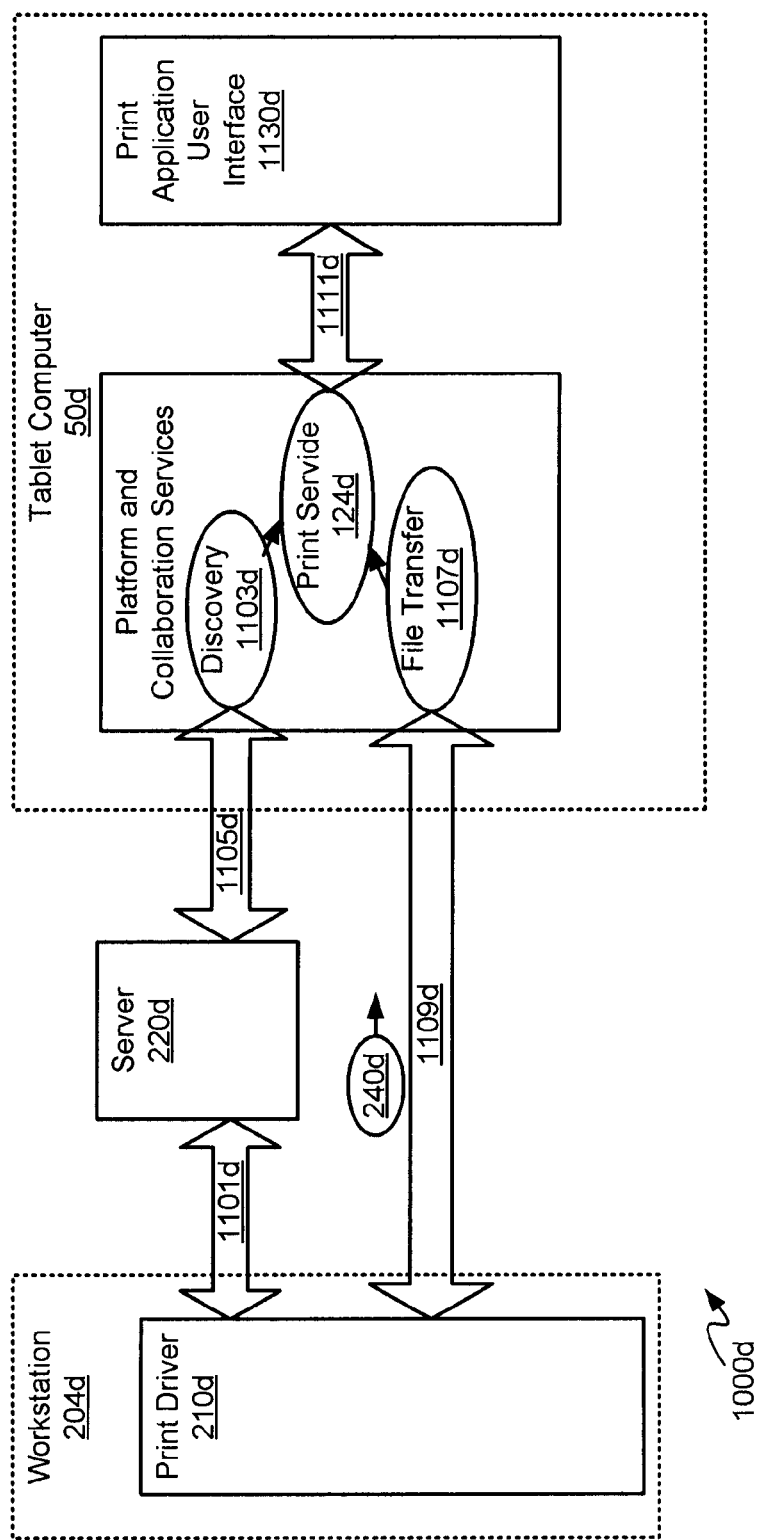
FIG. 15 shows another example system for document management.

FIG. 15 is substantially similar to FIG. 11, with like elements having like numbers with, however, a "d" appended thereto rather than a "c". Notification application 1103*d* has, however, been replaced with discovery application 1103*d*, which will interchangeably referred to as discovery 1103*d*. Discovery 1103*d* can be enabled to assist in the process of determining a network address of tablet computer 50*d* such that a web server application (e.g. file transfer application 1107*d*) can be launched and print file 240*d* transmitted to tablet computer 50*d*. For example, notification application 1103*d* can be enabled to provide notification to, for example print service 124*d*, that server 220*d* and/or computer 204*d* is waiting for tablet device 50*d* to perform an action and hence cause tablet computer 50*d* to perform an action such as pull print request 240*d* from computer 204*d*, as will presently be explained.

Figure 13:
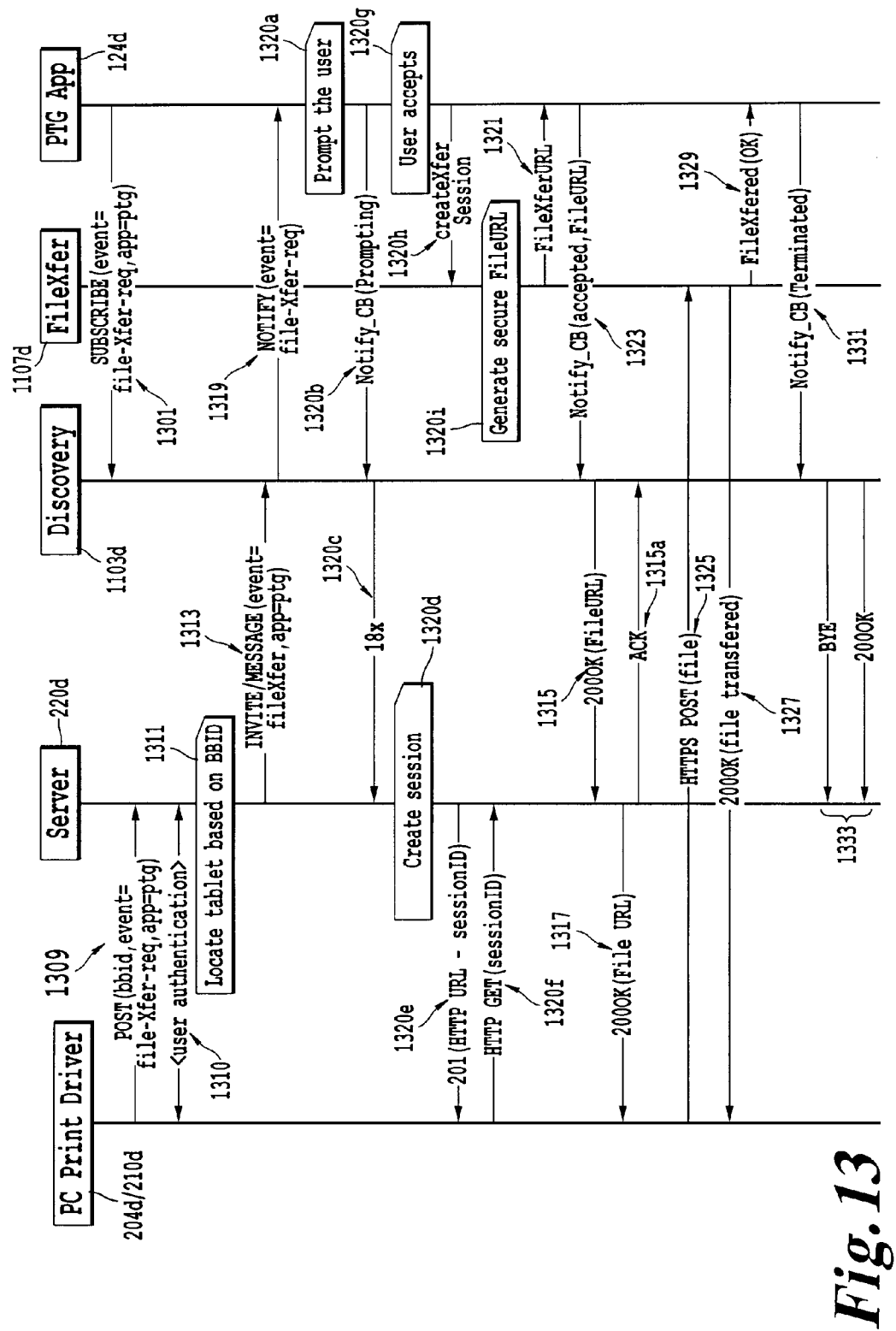

FIG. 13 depicts a communication diagram of communications between print driver 210*d* at computer 204*d*, server 220*d* and print service 124*d*, discovery 1103 and file transfer 1107*d* at tablet computer 50*d* in implementation where a "push" process is implemented, in which computer 204*d* pushes print request 240*d* to tablet computer 50*d*. In example embodiments, communications between computer 204*d*, server 220*d* and tablet computer 50*d* can occur according to any suitable protocol and/or combination of protocols, including but not limited to SIP protocols.

1301 and 1309 are similar to 1201 and 1209 respectively of FIG. 12, however the post at 1309 posts: the identifier of tablet computer 50*d*, an identifier of a type of event that is to occur between computer 204*d* and tablet computer 50*d* (e.g. a file transfer event denoted by "event=file-xfer-req"), and an identifier of a service associated with the event (e.g. print service 1124*c* as denoted by "app=ptg"). However, any suitable information can be posted which indicates that a document is to be printed to tablet computer 50*c* and that the information posted is not to be considered particularly limiting.

At 1311, server 220*d* locates tablet computer 50*d* based on the identifier of the tablet computer 50*d* ("BBID") as described above, and at 1313 transmits an invite message to discovery 1103*d* similar to the invite message of 1213, however the invite message of 1313 includes the identifier of a type of event that is to occur between computer 204*d* and tablet computer 50*d* (e.g. a file transfer event denoted by "event=file-xfer-req"), and the identifier of a service associated with the event (e.g. print service 1124*c* as denoted by "app=ptg"). At 1319, discovery 1103*d* notifies print service 124*d* that a print event has been requested, and at 1320*a* print service 124*d* causes PAUI 1130*d* to provide a prompt at a display of tablet computer 50*d* as to whether or not to accept the incoming print request. For example, print service 124*d* and PAUI 1130*d* can communicate via link 1111*d*, such that PAUI 1130*d* provides a prompt at the display of tablet computer 50*d* such as "Incoming print request" with an option to "Accept" or "Decline" the request. The format and/or wording of the prompt is not to be considered particularly limiting.

In any event, while tablet computer 50*d* is waiting for a response to the prompt, at 1320*b*, print service 124*d* notifies discovery 1103*d* that a prompt is being provided and that tablet computer 50*d* is waiting for a response to the prompt. In turn, at 1320*c*, discovery 1103*d* notifies server 220*d* ("18x" in SIP notation) that tablet 50*d* is providing an alert to a print request. At 1320*d*, server 220*d* creates a session and at 1320*e* provides a session identifier to computer 204*d*, which responds at 1320*f* with a hanging "GET" request. In other words, at least a portion of computer 204*d* enters a waiting mode until a response to the prompt is received.

In present implementations, it is assumed that a positive response to the prompt is received at 1320*g*: for example, PAUI 1130*d* received the positive response and communicates such to print service 124*d*. In other implementations, a negative response to the prompt can be received, which point messages are exchanged between tablet device 50*d*, server 220*d* and computer 240*d* indicating that the print request has been rejected. However, in present implementations, when a positive response to the prompt is received at 1320*g*, at 1320*h*, print service communicates with file transfer 1107*d* to create a file transfer session. File transfer 1107*d* starts a mini HTTP server at tablet device 50*d*, similar to the mini HTTP server started by computer 204*d* at 1205. File transfer 1107*d* responds, at 1320*i*, by generating an address for receiving print request 240*d*, which in these implementations can include but is not limited to an IP address, a file transfer URL, and the like. The address for receiving print request 240*d* is then provided to print service 124*d* at 1321, and at 1323 print service notifies discovery 1103*d* that the prompt has received a positive response along with the address for receiving the print request 240*d*.

At 1315, discovery 1103*d* notifies ("200OK") server 220*d* of the address for receiving print request 240*d*, and acknowledges the notification at 1315*a*. In turn, at 1317, server 220*d* notifies computer 204*d* of the address for receiving print request 240*d*. Computer 204*d* interprets message received at 1317 as a response to the hanging "GET" at 1320*f*, and responds at 1325 by posting print request 240*d* to the address received at 1317: in other words computer 204*d* transmits print request 240*d* to the file URL generated by file transfer 1107*d* at 1320*i*, for example via link 1109*d*. File transfer 1107*d* responds to receiving print request 240*d* by: at 1327 notifying computer 104*c* that print request 240*d* has been received; and at 1329 notifying print service 124*d* that print request 240*d* has been received. At 1331 print service 124*d* notifies discovery 1103*d* that the session is to be terminated, and at 1333 discovery 1103*d* notifies server 220*d* that the session is to be terminated (e.g. using both a "200OK" message and a "BYE" Message).

In these implementations, server 220*d* is enabled to negotiate the notification process and that computer 204*d* pushes print request 240*d* to tablet computer 50*d* once tablet computer print request 240*d* has been approved at tablet computer 50*d*. In these example implementations, a web service is first offered (in a notification request) from a first computing device (e.g. computer 204*d*) to a second computing device (e.g. tablet computer 50*d*), and the second computing device returns a network address (e.g. an IP address and/or a URL) to the first computing device once the web service is approved (e.g. by receiving a positive response to a prompt provided at a display device of the second computing device); a file associated with the web service is then pushed to the provided network address. Hence, a user associated with the second computer has an option to accept or decline a notification request.

However, in other example implementations, 1320*a*-1320*g* can be omitted and print request 240*d* is pushed to tablet computer 50*d* without providing a prompt.

In further example implementations, print driver 210*d* at computer 104*c* invoke a RESTful interface on server 220*d* (e.g. over HTTPS), to "discover and communicate" with its peer app component (e.g. discovery 1103*d*) at target table computer 50*d*. This is essentially a "print request" from the computer 204*d* to tablet computer 50*d*.

Server 220*d* authenticates the request, to verify the identity of the requestor. Server 220*d* does this by verifying a "token" that server 220*d* had issued to computer 204*d* previously.

Server 220*d* then locates tablet computer 50*d* based on a device identifier and notify tablet computer 50*d* about the event. If tablet computer 50*d* is not found, or not "in coverage" at, server 220*d* would return an error response back to print driver 201*c* and an error message will be presented at work station 204*d*.

At tablet computer 50*d*, discovery 1103*d* receives the event (e.g. over SIP infrastructure) and notifies print service 124*d*, which has previously subscribed to this event type. A prompt to accept the request can be included or omitted. In any event, once the request is accepted print service 124*d* requests file transfer 1107*d* to setup and provide a file address (e.g. the URL referred to above) for file transfer. File transfer 1107*d* then sends back the file address to server 220*d* which in turn responds back to computer 204*d*. Print driver 210*d* then transfers the file (i.e. print request 240*d*) directly tablet computer 50*d* using the file address.

In some implementations, signaling and call flow can change to support session-based poke-and-pull notifications (e.g. using a SIP INVITE method) when prompting is supported and/or to support printing to multiple devices simultaneously, canceling a print requests, etc. In an example embodiment, STUN (Session Traversal Utilities for NAT (network address translation)) [RFC (Request for Comments) 5389] protocol can be used by tablet computer 50*d* to obtain its external IP address, and if a direct connection is not possible due to firewall and NAT traversal issues, a globally accessible media midpoint can be used, similar to TURN (Traversal Using Relays around NAT) [RFC 5766) and ICE (Interactive Connectivity Establishment) [RFC 5245].

Figure 14:
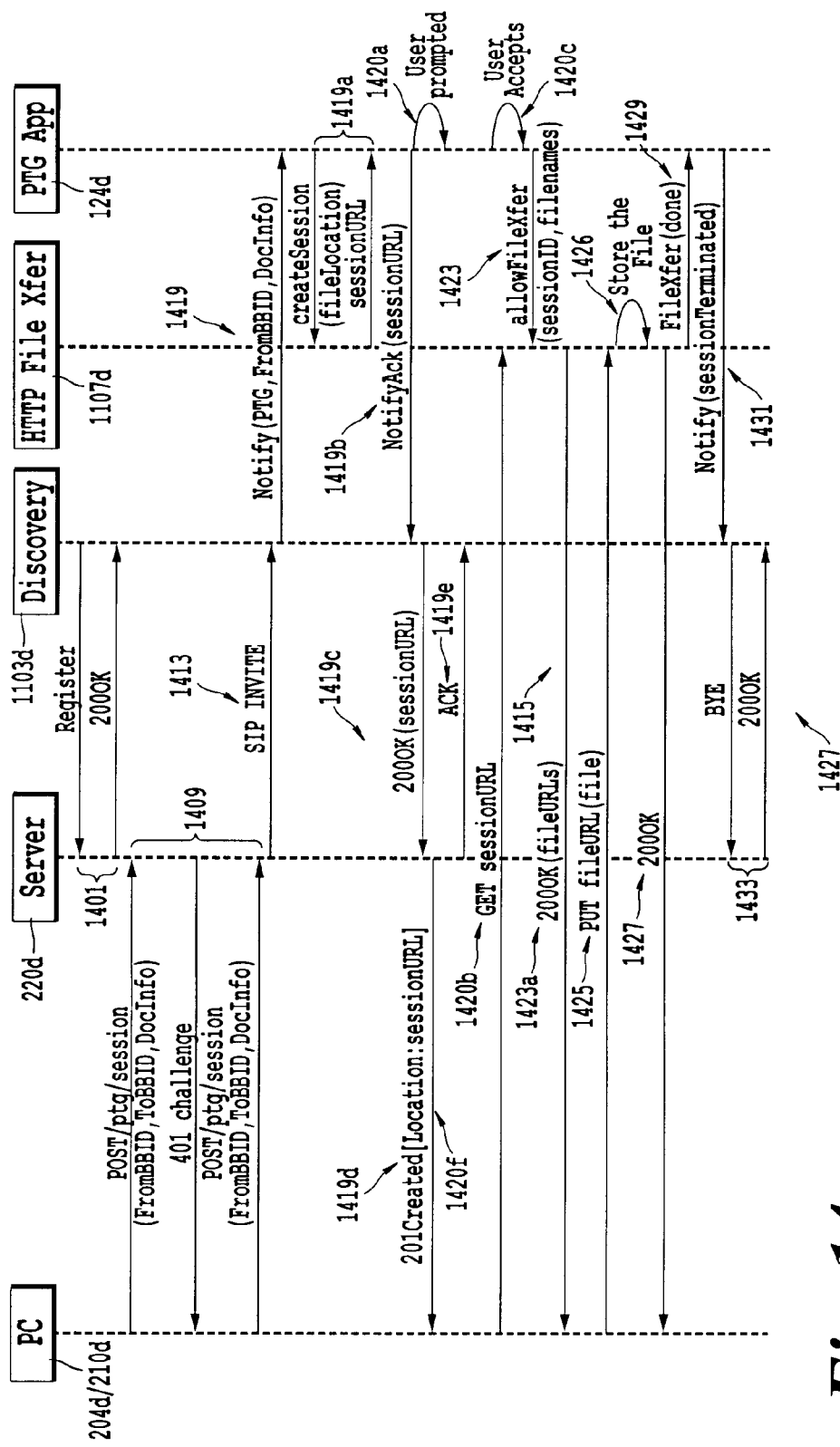

Attention is next directed to FIG. 14 which depicts a diagram of communications between print driver 210*d* at computer 204*d*, server 220*d* and print service 124*d*, discovery 1103*d* and file transfer 1107*d* at tablet computer 50*d* in implementation where a "push" process is implemented, in which computer 204*d* pushes print request 240*d* to tablet computer 50*d*. In example embodiments, communications between computer 204*d*, server 220*d* and tablet computer 50*d* can occur according to any suitable protocol and/or combination of protocols, including but not limited to SIP protocols. Communication diagram of FIG. 14 is similar to the communication diagram of FIG. 13, however in the communication diagram of FIG. 14, once notification occurs, computer 204*d* posts a hanging "GET" to tablet computer 50*d* rather than server 220*d*, as will presently be explained.

At 1401, discovery 1103*d* registers with server 220*d* which confirms with a confirmation message (e.g. "200OK"). While a similar step is not depicted in FIGS. 12 and 13, a similar step can occur in the communication diagrams of FIGS. 12 and 13.

At 1409, computer posts to server 220*d*: the identifier of tablet computer 50*d* and information regarding the document to be printed, for example a file identifier and/or file name. However, any suitable information can be posted which indicates that a document is to be printed to tablet computer 50*d* and that the information posted is not to be considered particularly limiting.

At 1413, server 220*d* transmits an invite message to discovery 1103*d* similar to the invite message of 1214. At 1419, discovery 1103*d* notifies print service 124*d* that a print event has been requested. At 1419*a*, print service communicates with file transfer 1107*d* to create a session, which returns a session address ("sessionURL") to print service 124*d*. In some example implementations, a file location identifier is also passed from computer 204*d* to server 220*d* to tablet computer 50*d*, which can be provided to file transfer 1107*d*.

At 1419*b*, print service 124*d* acknowledges receipt of the notify message received at 1419, and further provides the session address to discovery 1103*d* which transmits the session address to server 1102 at 1419*c*, which in turn transmits the session address to computer 104*c* at 1419*d*, as well as acknowledging receipt of session address at 1419*e*.

In addition to implementing 1419*b*, at 1420*a*, print service 124*d* causes a prompt to be provided similar to 1320*a* described above. In other words, while the session addressed is being passed to computer 204*d*, tablet 50*d* provides a prompt as to whether or not accept the print request.

In any event, at 1420*b*, computer 204*d* transmits a "GET" request to the session addressed provided at 1419*d*. The get request at 1420*b* is a hanging "GET" request, similar to that of 1320*f*, however transmitted to tablet computer 50*d* rather than server 220*d*. Hence, once server 220*d* acknowledges receipt of the session address received at 1419*c*, server 220*d* is no longer involved in the file transfer.

At 1420c, a positive response to the prompt is received, similar to 1420g described above, and at 1423 print service transmits an "allow file" message to file transfer 1107d, similar to 1323. However, the allow file message at 1423 includes the session identifier and the file identifier previously received. At 1423a, file transfer 1107d transmits a response to the hanging get received at 1420b, which includes an address for posting print request 240d. Computer 204d responds by posting ("PUT") print request 240d to the address for posting print request 240d. File transfer 1107d receives print request 249c and causes the resulting file to be stored at 1426 for later access by an application for rendering the file. File transfer 1107d further acknowledges receipt of print request 240d at 1427, and further notifies print service 124d that print request 240d has been received. At 1431 print service 124d notifies discovery 1103d that the session is to be terminated, and at 1433 discovery 1103d notifies server 220d that the session is to be terminated (e.g. using both a "200OK" message and a "BYE" Message).

In these example implementations, server 220d is enabled to negotiate the notification process and that computer 204d pushes print request 240d to tablet computer 50d once tablet computer print request 240d has been approved at tablet computer 50d. In these example implementations, a web service is first offered (in a notification request) from a first computing device (e.g. computer 204d) to a second computing device (e.g. tablet computer 50d), and the second computing device returns a network address (e.g. an IP address and/or a URL) to the first computing device once the web service is approved (e.g. by receiving a positive response to a prompt provided at a display device of the second computing device); a file associated with the web service is then pushed to the provided network address. Hence, a user associated with the second computer has an option to accept or decline a notification request.

Communication diagrams, of FIGS. 12-13 have been described with reference to systems 1000d. System 1000d can be enabled to implement one or more of the communication diagrams of FIGS. 12-13, though generally not simultaneously, and can be further enabled to pull print request 240c to tablet computer 50c. Further, tablet computer 50d can be further enabled to obtain approval to accept, and alternatively decline, print request 240d.

In some example implementations, systems 1000/1000d can be enabled to only allow printing to one device only at a time, even there are multiple devices associated with a user. Further, print drivers 210c/210d can be enabled to support printing to a plurality of tablet computers (e.g. each similar to tablet computer 50c/50d).

However, in other implementations, systems 1000/1000d can be enabled for a plurality of print "sessions", with several file transfers taking place simultaneously. Such transfers can be implemented using a plurality of session identifiers, a plurality of file addresses and the like.

In yet further implementations, print drivers 210c/210d could be enabled to receive a PIN (print identification number) in the "printer" that they install, such that specific printers can be targeted in a print request. If PIN is blank, server 220c/220d will select the first online/in-coverage device to send the request to. If PIN is a given indicator, such as "*", server 220c/220d will target all (online/in-coverage) devices of associated with a given identifier of a user.

For each of the communication diagrams of FIG. 11-13, computer 204c/204d is enabled to sign-in (using any suitable credentials, such as an identifier of tablet device 50c/50d) and obtain authentication credentials, such as an authentication token, in an example embodiment.

Communication between computer 204c/204d and server 220c can be secure (for signing in, as well as print request signaling), for example using HTTPS (HTTP over SSL (Secure Socket Layer) or HTTP Secure), in example embodiments. For this, server 220c/220d is enabled to access a TLS server and will present its own certificate to computer 204c/204d. Such a certificate can be similar to certificates used to provide secure media communications, such as with Video Chat applications.

Communication between server 220c/220d and tablet computer 50c/50d can also be secure.

Secure communications can also occur for the file transfer directly between computer 204c/204d and tablet computer 50c/50d which can also be over HTTPS.

Tablet computer 50d can also authenticate computer 204d in the HTTPS POST request for file transfer, e.g. at 1325 and/or 1425. When tablet computer 50d gets a print request, it would setup and generate a URL to send back to computer 204d for pushing the file. This URL goes all the way back to computer 204d, through secure TLS (from tablet computer 450d to server 220d), and HTTPS (from server 220d to computer 204d). In the URL that tablet computer 50d generates, tablet computer 50d can embeds a temporary "token" for a session. Tablet computer 50d can verify this token in the HTTP request received later from computer 240d during file transfer to ensure authenticity.

In further implementations, server security token issued and stored at computer 204c/204d for printing to tablet computer 50c/50d can be revoked. Hence, if computer 204c/204d (e.g. a laptop) is lost or transferred, rights to print to tablet computer 50c/50d can be revoked.

For example, a "Token Revocation" command could be generated at tablet computer 50c, which would timestamp of the event. Hence, any token associated with a time before the revocation would be considered "invalid" or "expired".

Servers 220c/220d could verify authenticity, expiry, etc. of tokens. For example, in requests to tablet computer 50c/50d, server 220c/220d could also pass along the time that the token was issued. Print service 124c/124d could check this timestamp against the timestamp of revocation. If the issued time was before the revoked time, tablet computer 50c/50d would send the result back to server 220c/220d which inform print driver 210c/120d, which would then delete the stored (but invalid) token permanently and optionally provide a prompt for obtaining a new token.

In yet further example variations, systems and method described herein can be implemented in a consumer environment rather than an enterprise environment, For example, a household computer can be used to "print" to tablet computers associated with each member of the household computer via a household network and/or a consumer network and/or a household server and/or a consumer server operated, for example, by a service provider.

While specific example embodiments of the invention have been described and illustrated, such example embodiments should be considered illustrative of the invention only and not as limiting the invention as construed in accordance with the accompanying claims.

The invention claimed is:

1. A method of requesting a document to be displayed at a portable electronic device, comprising:
installing, at a computer, a printer driver for displaying documents at the portable electronic device;
creating an association of a portable account identifier, associated with a portable account, with a unique identifier of the portable electronic device, the association occurring at a time the portable electronic device is provisioned with the portable account;

using the printer driver and the association to identify a network printer address; and transmitting, from the computer, the document, based on the association and the network printer address.

2. The method of claim 1, wherein the association of the portable account identifier with the unique identifier is removable.

3. The method of claim 1, wherein the document is a portable document format (PDF) document.

4. The method of claim 1, wherein the computer is connected to the portable electronic device via a wireless, Wi-Fi or a universal serial bus (USB) connection.

5. The method of claim 1, further comprising executing at the computer an application having a print function.

6. The method of claim 1, wherein the installing includes adding the portable electronic device to a list of printer devices available to the computer.

7. The method of claim 1, wherein the using the printer driver includes selecting the portable electronic device from the list of printer devices.

8. A method of displaying a document at a portable electronic device, comprising:

creating an association of a portable account identifier, associated with a portable account, with a unique identifier of the portable electronic device, the association occurring at a time the portable electronic device is provisioned with the portable account;

using the association to receive the document at the portable electronic device over a network based on a network printer address, the network printer address being based on the association;

receiving an input at the portable electronic device to display the document; and displaying the document on a display of the portable electronic device.

9. The method of claim 8, wherein the association of the portable account identifier with the unique identifier is removable.

10. The method of claim 8, further comprising removing the association so that document display requests are not receivable at the portable electronic device.

11. The method of claim 8, wherein the document is a portable document format (PDF) document.

12. The method of claim 8, wherein the document received at the portable electronic device is transmitted from a computer.

13. The method of claim 12, wherein the portable electronic device is connected to the computer via a wireless, Wi-Fi or a universal serial bus (USB) connection.

14. The method of claim 8, wherein the network is a wireless local area network (WLAN).

15. A method of identifying a document to be displayed at a portable electronic device, comprising:

creating an association of a portable account identifier, associated with a portable account, with a unique identifier of the portable electronic device the associated with the portable device association occurring at a time the portable electronic device is provisioned with the portable account;

installing, at a computer, a printer driver for printing at the portable electronic device, including adding the portable electronic device to a list of printer devices available to the computer;

using the association and the printer driver, including selecting the portable electronic device from the list of printer devices, to identify a network printer address to transmit the document to the portable electronic device over a network; and transmitting, from the computer, the document, based on the association and the network printer address.

16. The method of claim 15, wherein the association of the portable account identifier with the unique identifier is removable.

17. The method of claim 15, wherein the document is a portable document format (PDF) document.

18. The method of claim 15, wherein the computer is connected to the portable electronic device via a wireless, Wi-Fi or a universal serial bus (USB) connection.

19. The method of claim 15, further comprising executing at the computer an application having a print function.

20. The method of claim 15, wherein the installing includes adding the portable electronic device to a list of printer devices available to the computer.

21. The method of claim 15, wherein the using the printer driver includes selecting the portable electronic device from the list of printer devices.

22. A portable electronic device to display a document, comprising:

a display, and a processor, controlling the display, and configured to:

create an association of a portable account identifier, associated with a portable account, with a unique identifier of the portable electronic device, the association occurring at a time the portable electronic device is provisioned with the portable account;

use the association to receive the document at the portable electronic device over a network based on a network printer address, the network printer address being based on the association;

receive an input at the portable electronic device to display the document; and display the document on the display.

23. The portable electronic device of claim 22, wherein the association of the portable account identifier with the unique identifier of the portable electronic device is removable.

24. The portable electronic device of claim 22, wherein the processor is further configured to remove the association so that document display requests are not receivable at the portable electronic device.

25. The portable electronic device of claim 22, wherein the document is a portable document format (PDF) document.

26. The portable electronic device of claim 22, wherein the computer is connected to the portable electronic device via a wireless, Wi-Fi or a universal serial bus (USB) connection.

* * * * *